(12) United States Patent
Park et al.

(10) Patent No.: US 11,942,061 B2
(45) Date of Patent: *Mar. 26, 2024

(54) ELECTRONIC DEVICES AND OPERATING METHODS OF ELECTRONIC DEVICES

(71) Applicant: Samsung Electronics Co., Ltd., Suwon-si (KR)

(72) Inventors: Unki Park, Suwon-si (KR); Se Whan Na, Seoul (KR); Hyunwook Lim, Seoul (KR); Woohyuk Jang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,064

(22) Filed: Jan. 6, 2023

(65) Prior Publication Data

US 2023/0154437 A1 May 18, 2023

Related U.S. Application Data

(63) Continuation of application No. 17/212,286, filed on Mar. 25, 2021, now Pat. No. 11,574,612.

(30) Foreign Application Priority Data

Aug. 13, 2020 (KR) ........................ 10-2020-0101949

(51) Int. Cl.
*G09G 5/02* (2006.01)
*G09G 5/10* (2006.01)
*H04N 23/57* (2023.01)

(52) U.S. Cl.
CPC ............... *G09G 5/10* (2013.01); *H04N 23/57* (2023.01); *G09G 2300/0439* (2013.01); *G09G 2310/0232* (2013.01); *G09G 2320/0233* (2013.01)

(58) Field of Classification Search
CPC ............ G09G 5/10; G09G 2300/0439; G09G 2310/0232; G09G 2320/0233; G09G 2320/0686; G09G 3/2074; G09G 3/2003; G09G 3/3208; G09G 2320/0626; H04N 23/57; H04M 1/0264; H04M 1/0266; G06F 3/1431; G06F 3/005
See application file for complete search history.

(56) References Cited

U.S. PATENT DOCUMENTS 7,787,542 B2   8/2010  Sun et al.
8,774,537 B2   7/2014  Kondo
(Continued)

FOREIGN PATENT DOCUMENTS

JP       2008-281947 A    11/2008
KR    10-2019-0026128 A    3/2019

*Primary Examiner* — Adam R. Giesy
(74) *Attorney, Agent, or Firm* — Harness, Dickey & Pierce, P.L.C.

(57) ABSTRACT

An electronic device includes a display panel that includes a first region including first pixel groups and a second region including second pixel groups, and a compensation circuit. The compensation circuit may receive first image data. The compensation circuit may compensate to generate second image data in response to a determination that the first image data corresponds to at least one of one or more particular first pixel groups that are adjacent to a boundary between the first region and the second region or one or more particular second pixel groups that are adjacent to the boundary. The compensation circuit outputs the second image data to the display panel.

20 Claims, 13 Drawing Sheets

(56) References Cited

U.S. PATENT DOCUMENTS

| | | |
|---|---|---|
| 10,147,391 B2 | 12/2018 | Jun et al. |
| 10,397,513 B2 | 8/2019 | Bae et al. |
| 10,546,553 B2 | 1/2020 | Bian et al. |
| 2019/0130822 A1 | 5/2019 | Jung et al. |
| 2020/0005704 A1 | 1/2020 | Tong et al. |
| 2021/0065625 A1 | 3/2021 | Wang et al. |

ELECTRONIC DEVICES AND OPERATING METHODS OF ELECTRONIC DEVICES

CROSS-REFERENCE TO RELATED APPLICATIONS

This application is a continuation of U.S. application Ser. No. 17/212,286, filed on Mar. 25, 2021, which claims priority under 35 U.S.C. § 119 to Korean Patent Application No. 10-2020-0101949 filed on Aug. 13, 2020, in the Korean Intellectual Property Office, the disclosure of each of which are incorporated by reference herein in their entirety.

BACKGROUND

Example embodiments of the inventive concepts described herein relate to relate to electronic devices, and more particularly, relate to electronic devices improving an image quality of display panels including heterogeneous pixel patterns and an operating method of the electronic devices.

Mobile devices such as a smartphone and a smart pad may include cameras for capturing image data. At least one camera may be disposed on a back surface of a mobile device, and at least one camera may be disposed on a front surface of the mobile device.

The mobile device may display an image to a user through a display panel disposed on the front surface. Both the camera and the display panel are disposed on the front surface of the mobile device. In this case, a space that the camera occupies and a space that the display panel occupies may compete with each other.

To maximize a size of an image to be displayed through the display panel with the space for the camera minimized, combinations of various types of display panels such as a display panel providing a camera space in the form of water drop and a display panel providing a camera space in the form of a punching hole have been attempted.

SUMMARY

Some example embodiments of the inventive concepts provide an electronic device improving an image quality of a display panel including a first region for displaying image data and a second region for displaying image data and also providing transparency allowing a light for a camera to be transmitted and an operating method of the electronic device.

According to some example embodiments, an electronic device includes a display panel that includes a first region including first pixel groups and a second region including second pixel groups, and a compensation circuit. The compensation circuit may receive first image data. The compensation circuit may compensate the first image data to generate second image data in response to a determination that the first image data corresponds to at least one of one or more particular first pixel groups that are adjacent to a boundary between the first region and the second region, or one or more particular second pixel groups that are adjacent to the boundary. The compensation circuit may output the second image data to the display panel.

According to some example embodiments, an electronic device includes a display panel that includes a first region including first pixel groups and a second region including second pixel groups, and a compensation circuit. The compensation circuit may receive first image data. The compensation circuit may compensate the first image data to generate second image data in response to a determination that the first image data corresponds to at least one of one or more particular first pixel groups that are adjacent to a boundary between the first region and the second region, or one or more particular second pixel groups that are adjacent to the boundary. The compensation circuit may output the second image data to the display panel. The boundary may include a first boundary, a second boundary, a third boundary, and a fourth boundary. In the one or more particular second pixel groups adjacent to the boundary, a first pattern of second pixel groups adjacent to the first boundary, a second pattern of second pixel groups adjacent to the second boundary, a third pattern of second pixel groups adjacent to the third boundary, and a fourth pattern of second pixel groups adjacent to the fourth boundary are identical.

According to some example embodiments, an operating method of an electronic device which includes a display panel includes displaying first image data corresponding to a first region of the display panel through one or more first pixel groups of the first region, performing compensation of second image data corresponding to a second region of the display panel to generate third image data, and displaying the third image data through one or more second pixel groups of the second region.

BRIEF DESCRIPTION OF THE DRAWINGS

The above and other objects and features of the inventive concepts will become apparent by describing in detail example embodiments thereof with reference to the accompanying drawings.

DETAILED DESCRIPTION

Below, some example embodiments of the inventive concepts may be described in detail and clearly to such an extent that an ordinary one in the art easily implements the inventive concepts.

Figure 1:
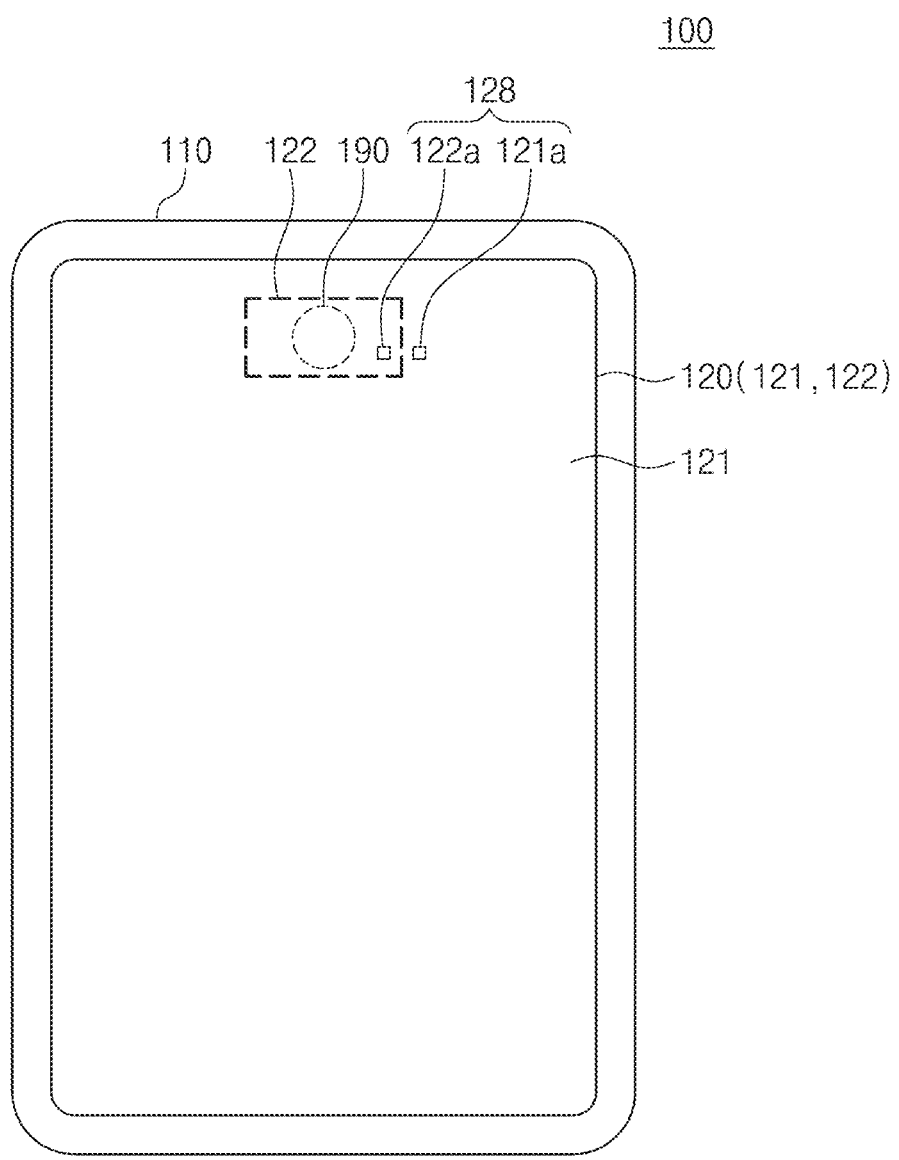
FIG. 1 illustrates an electronic device according to some example embodiments of the inventive concepts.

FIG. 1 illustrates an electronic device 100 according to some example embodiments of the inventive concepts. Referring to FIG. 1, the electronic device 100 may be a mobile device such as a smartphone or a smart pad. The electronic device 100 may include a body 110 and a display panel 120. The body 110 may execute an operating system and various applications and may output image data to the display panel 120 to display an image through the display panel 120.

The display panel 120 includes an array of pixels 128 configured to display an image and may include a first region 121 of pixels and a second region 122 of pixels. The first region 121 may include first pixels 121a configured to display an image. The second region 122 may include second pixels 122a configured to display an image. The first and second pixels 121a and 122a may be configured to display separate parts of a same, single image. Distinct features of the second pixels 122a of the second region 122 may be different from distinct features of the first pixels 121a of the first region 121. For example, at least one of a placement (or layout), a size, or a brightness of the first pixels 121a of the first region 121 may be different from at least one of a placement (or layout), a size, or brightness of the second pixels 122a of the second region 122.

The second region 122 may have transparency (e.g., transmittance, which may be a ratio of light transmitted through the second region 122 to incident light that is incident on the second region 122) allowing a light (e.g. incident light on the display panel 120 from an exterior of the electronic device 100) to be transmitted through the second region 122. A camera 190 (which may include an image sensor, including a CMOS image sensor device) configured to capture image data (e.g., third image data) may be provided under the second region 122. In particular, the camera 190 may be located in the electronic device 100 such that the display panel 120 is between the camera 190 and an exterior of the electronic device 100, and the camera 190 may capture an image of a scene exterior to the electronic device 100 (e.g., third image data) based on receiving and/or detecting light that is incident on the second region 122 and passes through the second region 122 to be transmitted through the second region 122 to be incident on the camera 190. Thus the camera 190 may be understood to capture image data through the second region 122. That is, the electronic device 100 may be implemented an under display camera (UDC). The transparency of the second region may be higher than the transparency of the first region 121 (e.g., the second region 122 may have transmittance between about 70% to about 90%, while the first region 121 may have transmittance between about 10% to about 60%).

Figure 2:
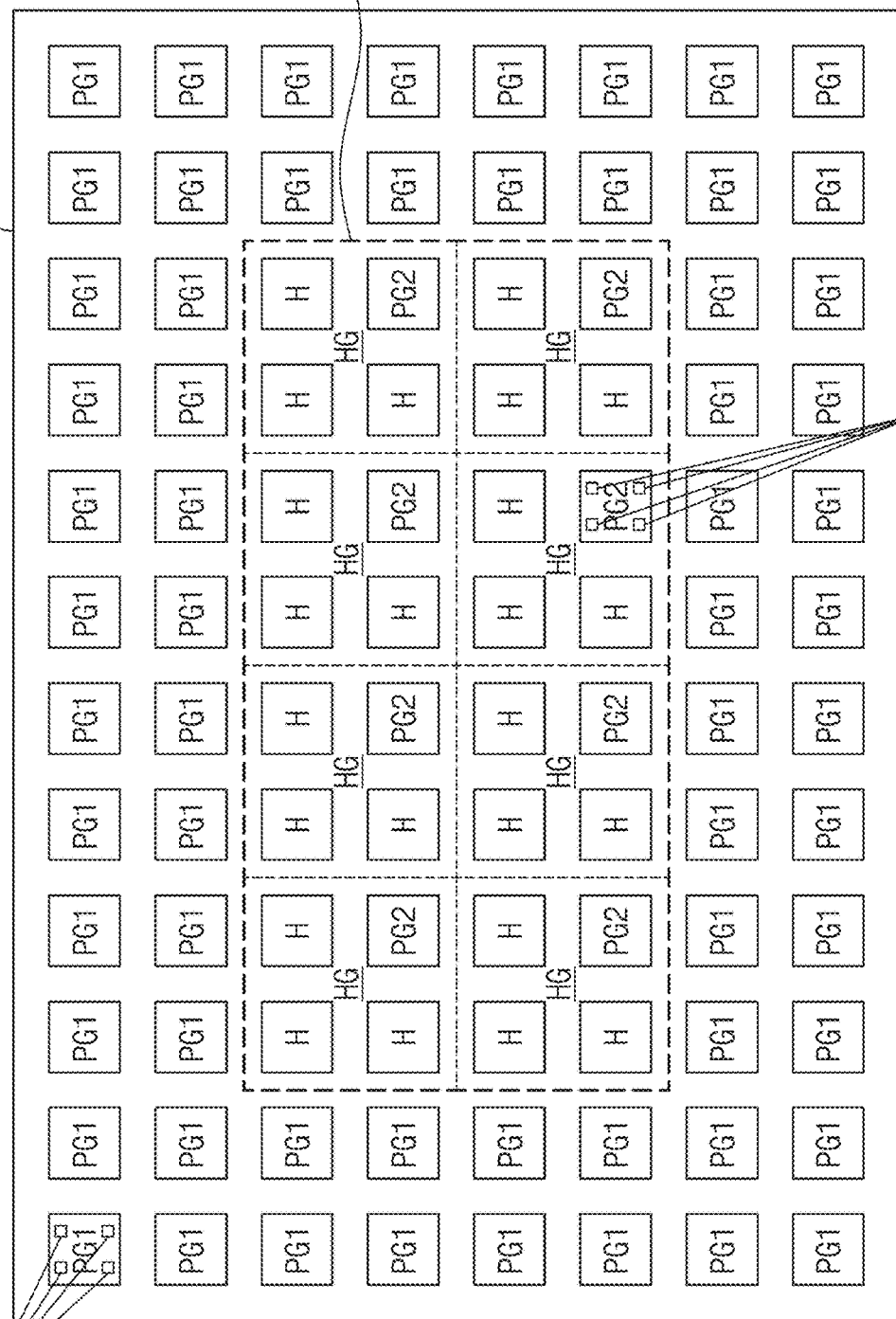
FIG. 2 illustrates a display panel in detail according to some example embodiments of the inventive concepts.

FIG. 2 illustrates the display panel 120 in detail. Referring to FIGS. 1 and 2, the first region 121 of the display panel 120 may include first pixel groups PG1. The first pixel groups PG1 may include first pixels 121a configured to display an image based on image data.

The second region 122 of the display panel 120 may include second pixel groups PG2. The second pixel groups PG2 may include second pixels 122a configured to display an image based on image data. In FIG. 2, a boundary 123 between the first region 121 and the second region 122 is marked by a dashed line. In some example embodiments, the boundary 123 between the first region 121 and the second region 122 may be in the form of a quadrangle including a first boundary (or a left side), a second boundary (or a top side), a third boundary (or a right side), and a fourth boundary (or a bottom side).

In the first region 121, the first pixel groups PG1 may be arranged at regular intervals. In the second region 122, the second pixel groups PG2 may be arranged at regular intervals. A distance between the second pixel groups PG2 of the second region 122 may be greater than a distance between the first pixel groups PG1 of the first region 121. That is, the density of the second pixel groups PG2 of the second region 122 may be lower than the density of the first pixel groups PG1 of the first region 121. Restated, a placement density of the first pixel groups PG1 of the first region 121 (e.g., density of first pixel groups PG1 in the first region 121) may be higher (e.g., greater) than a placement density of the second pixel groups PG2 of the second region 122 (e.g., density of second pixel groups PG2 in the second region 122)

Holes "H" may be provided in the second region 122, and each of the holes "H" may correspond to a size of each of the second pixel groups PG2 (or may have the size of each of the second pixel groups PG2). Pixels may not be provided in the holes "H", and the holes "H" may form spaces providing transparency to the second region 122. That is, a light may pass through the holes "H" of the second region 122, thereby being transmitted through the second region 122, and may then be transferred to a camera 190 under the display panel 120.

Each of the first pixel groups PG1 or each of the second pixel groups PG2 may include two or more pixels. Accordingly, it will be understood that the display panel 120 may include a first region of pixels (e.g., first region 121) that includes one or more (e.g., a plurality of) first pixel groups PG1 and a second region of pixels (e.g., second region 122) that includes one or more (e.g., a plurality of) second pixel groups PG2, where each first pixel group PG1 includes two or more first pixels 121a of the first region 121 and each second pixel group PG2 includes two or more second pixels 122a of the second region. Lights emitted from the two or more pixels in each of the first pixel groups PG1 or each of the second pixel groups PG2 may be combined to display a specific color that image data indicate. Each of the first pixel groups PG1 or each of the second pixel groups PG2 may be a set of pixels configured to display a specific color.

To make the transparency (e.g., transmittance) of the second region 122 high (e.g., about 70% to about 90% transmittance), for example higher than a transparency of the first region 121 (e.g., a transmittance of about 10% to about 60%), a distance between adjacent second pixels 122a of the second pixel groups PG2 may be smaller than a distance between adjacent first pixels 121a of the first pixel groups PG1. Also, to make the transparency of the second region 122 high (e.g., higher than the transparency of the first region 121), a part (e.g., a polarizing layer) of layers provided in the first region 121 may not be provided in (e.g., may be absent from) the second region 122.

The placement (or distribution) density of the first pixel groups PG1 in the first region 121 may be higher than the placement (or distribution) density of the second pixel groups PG2 in the second region 122. For example, the placement (or distribution) density of the first pixel groups PG1 in the first region 121 may correspond to a pixel density, of the first pixels 121a in the first region 121, of 96 pixels per inch (ppi) and the placement (or distribution) density of the second pixel groups PG2 in the second region 122 may correspond to a pixel density, of the second pixels 122a in the second region 122, of 40 pixels per inch (ppi). Accordingly, when the first pixel groups PG1 and the second pixel groups PG2 have the same brightness with regard to the same gray level, an image displayed by the second pixel groups PG2 of the second region 122 may be darker than an image displayed by the first pixel groups PG1 of the first region 121.

To prevent this phenomenon, with regard to the same gray level, the second pixel groups PG2 may be configured to display an image to be brighter than the first pixel groups PG1. Restated, when image data of a same gray level is input to be displayed by the first and second pixel groups PG1 and PG2, a brightness of light emitted by the second pixels 122a may be higher than a brightness of light emitted by the first pixels 121a so that the first pixels and second pixels collectively display an image having a same gray level across the first and second regions 121 and 122. Further restated, the second pixels 122a of one or more second pixel groups PG2 may be configured to emit light at a higher brightness than light emitted by the first pixels 121a of the one or more first pixel groups PG1 to cause said first and second pixel groups PG1 to display an image having a same gray level across the said first and second regions 121 and 122. For example, sizes of the pixels of the second pixel groups PG2 may be larger than sizes of the pixels of the first pixel groups PG1.

In some example embodiments, a hole group HG may be assumed. The hole group HG may be a space associated with one second pixel group PG2. With regard to the same gray level, the first pixel groups PG1 and the second pixel groups PG2 may be configured and controlled such that brightness of the first pixel groups PG1 included in the size (or area) of one hole group HG is identical (or similar) to brightness of the second pixel group PG2 included in the size (or area) of one hole group HG.

As illustrated in FIG. 2, four first pixel groups PG1 may be included in the size (or area) of one hole group HG. In this case, assuming that brightness of one second pixel group PG2 is "1", with regard to the same gray level, the first pixel groups PG1 may be configured and controlled such that brightness of one first pixel group PG1 is 0.25.

Accordingly, a total of brightness of the first pixel groups PG1 included in the size of one hole group HG may be "1", and a total of brightness of the second pixel group PG2 included in the size of one hole group HG may be "1". That is, with regard to the same gray level, brightness of an image displayed by the second pixel groups PG2 of the second region 122 may be identical to brightness of the image displayed by the first pixel groups PG1 of the first region 121.

Figure 3:
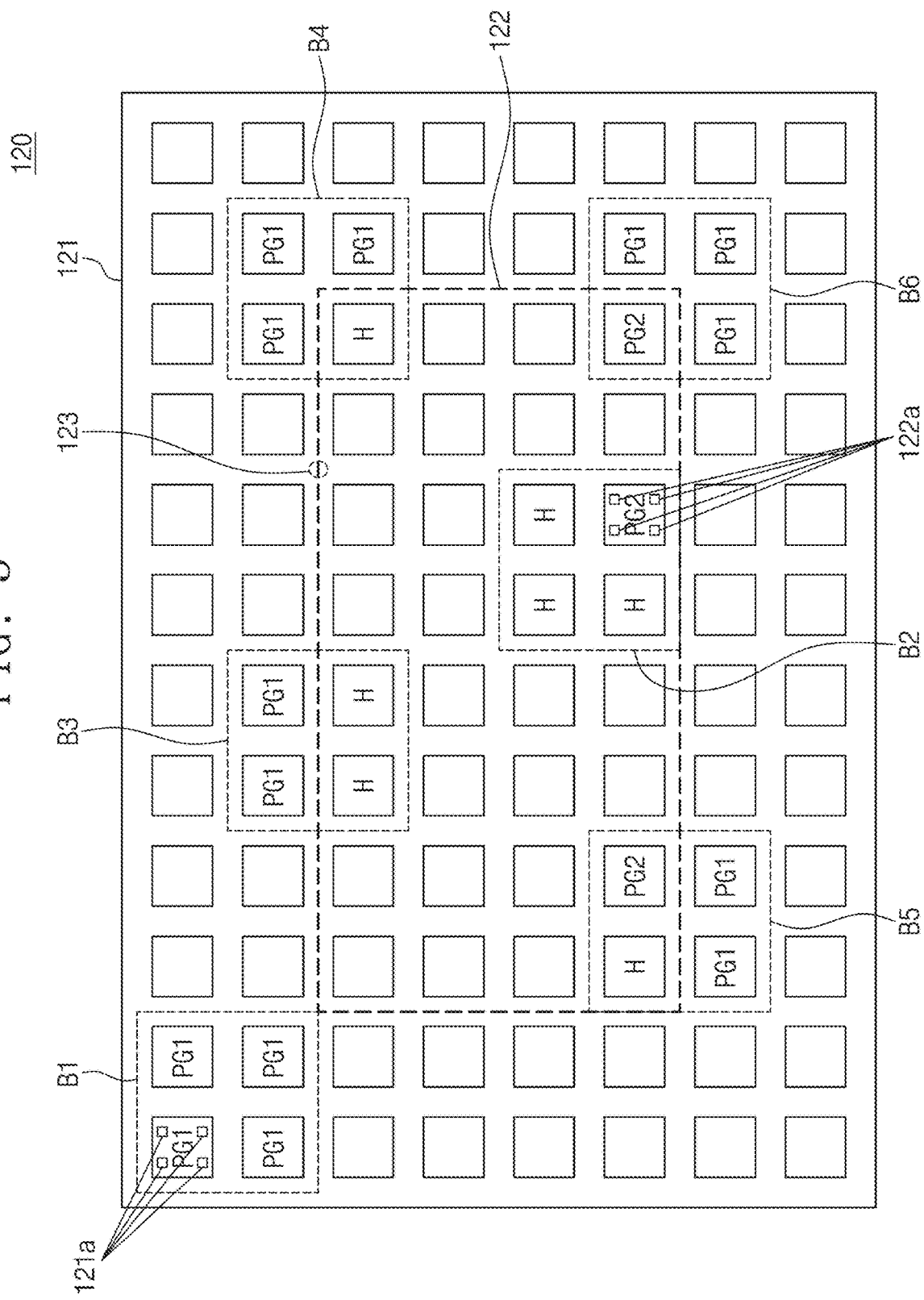
FIG. 3 illustrates an example in which brightness of an image displayed through first pixel groups and brightness of the image displayed through second pixel groups are different at a boundary between a first region and a second region with regard to the same gray level according to some example embodiments of the inventive concepts.

FIG. 3 illustrates an example in which brightness of an image displayed through the first pixel groups PG1 and brightness of the image displayed through the second pixel groups PG2 are different at the boundary 123 between the first region 121 and the second region 122 with regard to the same gray level. To prevent a drawing from being complicated, some of reference signs illustrated in FIG. 2 will be omitted in FIG. 3. A first block B1, a second block B2, a third block B3, a fourth block B4, a fifth block B5, and a sixth block B6 illustrated in FIG. 3 may have a size corresponding to one hole group HG. Blocks may herein be interchangeably referred to as "regions."

Referring to FIGS. 1, 2, and 3, the first block B1 includes four first pixel groups PG1. Accordingly, brightness of an image that the first pixel groups PG1 of the first block B1 display with regard to the same gray level may be "1". Brightness of the first block B1 may be general brightness of the first pixel groups PG1 included in the size (or area) of one hole group HG.

The second block B2 includes one second pixel group PG2. Accordingly, brightness of an image that the second pixel group PG2 of the second block B2 display with regard to the same gray level may be "1". Brightness of the second block B2 may be general brightness of the second pixel groups PG2 belonging to the size of one hole group HG. The brightness of the second block B2 may be identical to the brightness of the first block B1.

The third block B3 may include the boundary 123 between the first region 121 and the second region 122. The third block B3 may include two first pixel groups PG1. Brightness of an image that the first pixel groups PG1 of the third block B3 display with regard to the same gray level may be "0.5".

The fourth block B4 may include the boundary 123 between the first region 121 and the second region 122. The fourth block B4 may include three first pixel groups PG1. Brightness of an image that the first pixel groups PG1 of the fourth block B4 display with regard to the same gray level may be "0.75".

The fifth block B5 may include the boundary 123 between the first region 121 and the second region 122. The fifth block B5 may include two first pixel groups PG1 and one second pixel group PG2. Brightness of an image that the first pixel groups PG1 and the second pixel group PG2 of the fifth block B5 display with regard to the same gray level may be "1.5".

The sixth block B6 may include the boundary 123 between the first region 121 and the second region 122. The sixth block B6 may include three first pixel groups PG1 and one second pixel group PG2. Brightness of an image that the first pixel groups PG1 and the second pixel group PG2 of the sixth block B6 display with regard to the same gray level may be "1.75".

As illustrated in FIG. 3, in the same region, brightness associated with the same gray level may be differently expressed at the boundary 123 between the first region 121 and the second region 122. This may cause the unintended reduction of an image quality at the boundary 123 between the first region 121 and the second region 122.

Figure 4:
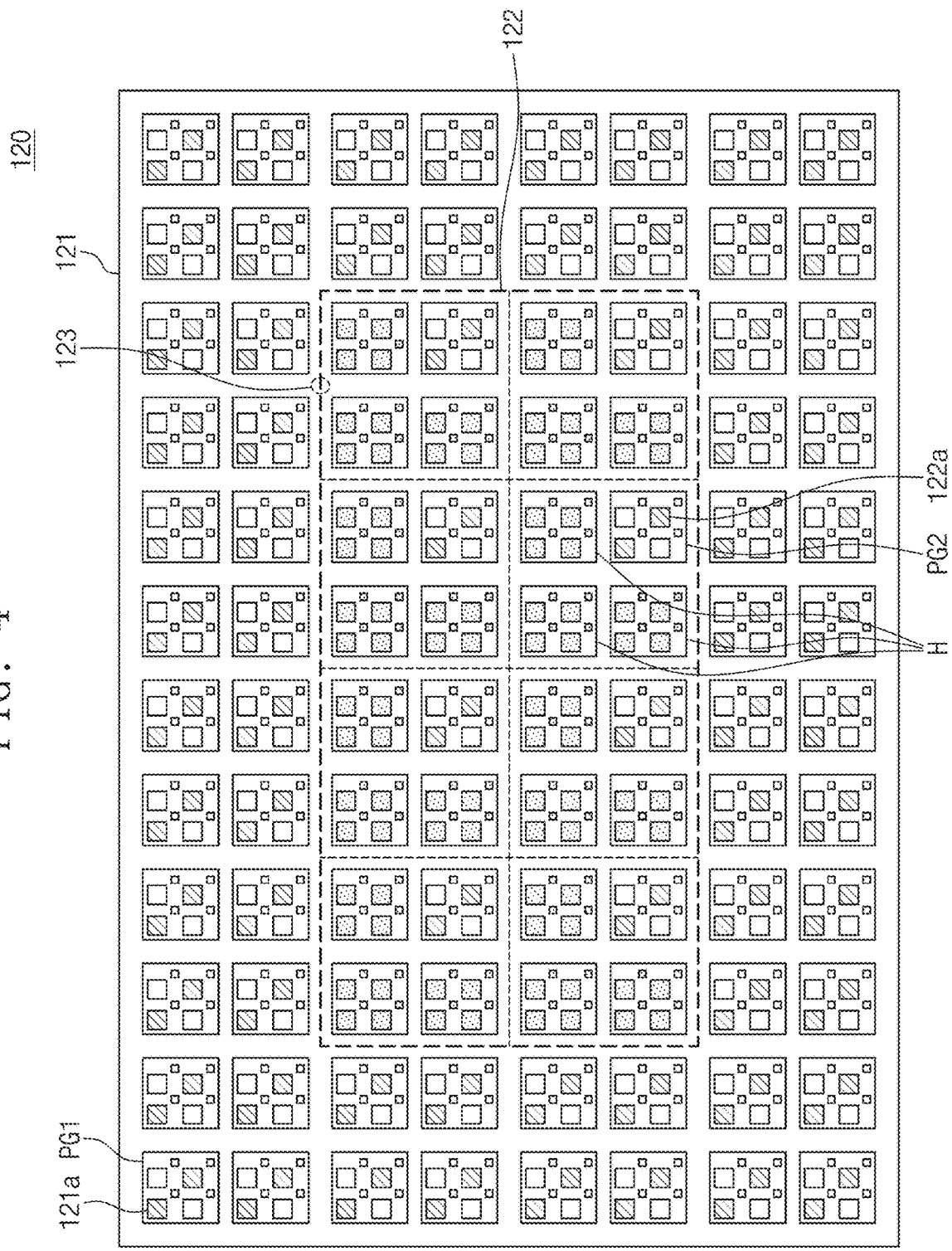
FIG. 4 illustrates first pixel groups, second pixel groups, and holes of a first region and a second region in detail according to some example embodiments of the inventive concepts.

FIG. 4 illustrates the first pixel groups PG1, the second pixel groups PG2, and the holes "H" of the first region 121 and the second region 122 in detail. In some example embodiments, it is assumed that the first pixel groups PG1 and the second pixel groups PG2 include pixels provided based on a pentile structure. However, the inventive concepts is not limited to the pentile structure. The inventive concepts may be applied to pixels that are provided in various patterns such as an RGB pattern.

As shown in FIG. 4, each of the first pixel groups PG1 and the second pixel groups PG2 may include first color pixels (e.g., blue pixels) marked by a relatively large quadrangle being empty, second color pixels (e.g., red pixels) marked by a relatively large quadrangle filled with a slash, and third color pixels (e.g., green pixels) marked by a relatively small quadrangle being empty.

For a brief description, sizes and placements of pixels of the first pixel groups PG1 and pixels of the second pixel groups PG2 may be illustrated as identical, but the sizes and placements of the pixels of the first pixel groups PG1 may be different from the sizes and placements of the pixels of the second pixel groups PG2. For example, the sizes of the pixels of the second pixel groups PG2 may be larger than the sizes of the pixels of the first pixel groups PG1. Intervals by which the pixels of the second pixel groups PG2 are spaced from each other may be smaller than intervals by which the pixels of the first pixel groups PG1 are spaced from each other.

The holes "H" are illustrated to be similar to the second pixel groups PG2. In the holes "H", portions corresponding to the pixels of the second pixel groups PG2 are filled with black dots. The portions filled with black dots may be regarded as portions in which components corresponding to pixels are not provided and which make the transparency (e.g., transmittance) of the second region 122 high (e.g., higher than the transmittance of the first region 121) and may be hereinafter referred to as "pixel holes".

Figure 5:
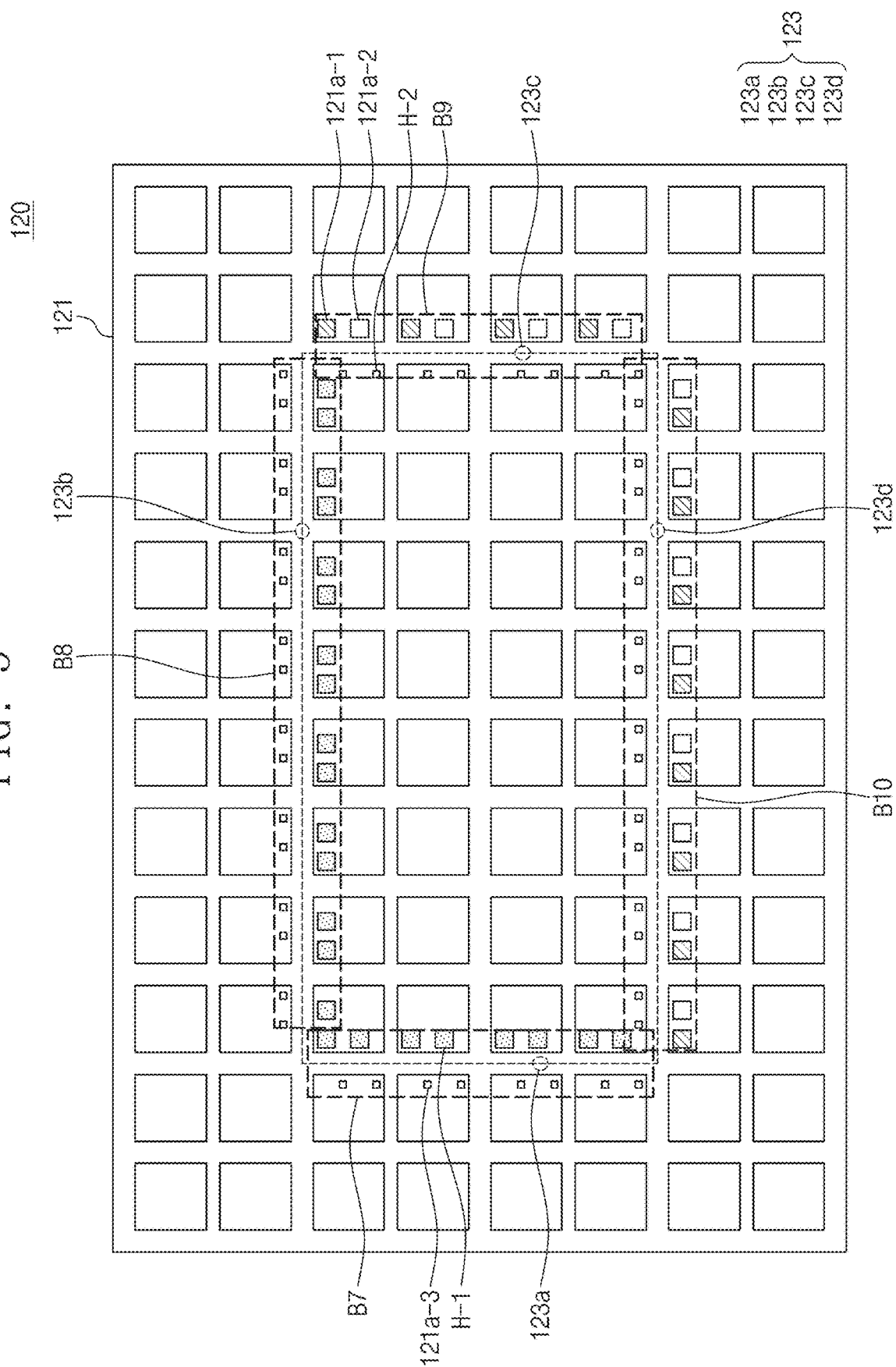
FIG. 5 illustrates pixels adjacent to a boundary between a first region and a second region of FIG. 4 according to some example embodiments of the inventive concepts.

FIG. 5 illustrates pixels adjacent to a boundary 123 between the first region 121 and the second region 122 of FIG. 4. To prevent a drawing from being complicated, some of the components illustrated in FIG. 4 will be omitted in FIG. 5.

Referring to FIGS. 4 and 5, a seventh block B7 shows pixels adjacent to the first boundary 123a (i.e., the left side) between the first region 121 and the second region 122. Referring to the seventh block B7, the third color pixels 121a-3 (i.e., the green pixels) of the first pixel groups PG1 of the first region 121 and the pixel holes H-1 of the holes "H" of the second region 122 may be adjacent to each other, such that there are no interposing pixels between said adjacent pixels. The pixel holes H-1 do not (e.g., are configured to not) emit a light. Accordingly, in the seventh block B7, a light emitted from the third color pixels 121a-3 may not be combined with other lights of the first color and the second color due to the pixel holes H-1 emitting no light, and an unintended line of a third color may be displayed along the first boundary 123a (i.e., the left side).

Referring to an eighth block B8, the third color pixels 121a-3 (i.e., the green pixels) of the first pixel groups PG1 of the first region 121 and the pixel holes H-1 of the holes "H" of the second region 122 may be adjacent to each other. The pixel holes H-1 do not emit a light. Accordingly, in the eighth block B8, a light emitted from the third color pixels 121a-3 may not be combined with other lights of the first color and the second color due to the pixel holes emitting no light, and an unintended line of the third color may be displayed along the second boundary 123b (i.e., the top side).

Referring to a ninth block B9, the first color pixels 121a-1 (i.e., the blue pixels) and the second color pixels 121a-2 (i.e., the red pixels) of the first pixel groups PG1 of the first region 121 and the pixel holes H-2 of the holes "H" of the second region 122 may be adjacent to each other. The pixel holes do not emit a light. Accordingly, in the ninth block B9, lights emitted from the first color pixels 121a-1 and the second color pixels 121a-2 may not be combined with another light of the third color due to the pixel holes H-2 emitting no light, and an unintended line of a color (i.e., magenta) corresponding to a combination of the first color (i.e., the blue color) and the second color (i.e., the red color) may be displayed along the third boundary 123c (i.e., the right side).

Referring to a tenth block B10, the first color pixels 121a-1 (i.e., the blue pixels) and the second color pixels 121a-2 (i.e., the red pixels) of the first pixel groups PG1 of the first region 121 and the pixel holes H-2 of the holes "H" of the second region 122 may be adjacent to each other. The pixel holes H-2 do not emit a light. Accordingly, in the tenth block B10, lights emitted from the first color pixels 121a-1 and the second color pixels 121a-2 may not be combined with another light of the third color due to the pixel holes H-2 emitting no light, and an unintended line of the color (i.e., magenta) corresponding to the combination of the first color (i.e., the blue color) and the second color (i.e., the red color) may be displayed along the fourth boundary 123d (i.e., the bottom side).

As shown in FIG. 5, the pixel groups PG1 and PG2 that include the pixels and/or pixel holes that are adjacent to one or more portions, sides, or the like of the boundary 123 may be understood to be pixel groups that are adjacent to the boundary 123 such that no interposing pixel groups are between said adjacent pixel groups and the boundary 123.

As described with reference to FIGS. 2 and 3, brightness associated with the same gray level may be differently expressed on the sides between the first region 121 and the second region 122. Also, as described with reference to FIGS. 4 and 5, unintended lines may be displayed at the boundary 123 (i.e., on the left, top, right, and bottom sides of the boundary 123) between the first region 121 and the second region 122. The electronic device 100 according to some example embodiments of the inventive concepts may perform compensation for image data corresponding to the boundary 123 between the first region 121 and the second region 122 to prevent a brightness difference and an unintended line(s) from occurring at or near the boundary 123, thereby reducing or preventing reduction in image quality of images displayed at least at the boundary 123 between the first and second regions 121 and 122, thereby improving the display performance of the display panel 120 while enabling the second region 122 to also provide sufficient transparency to enable the under display camera (e.g., camera 190) under the second region 122 to capture image data through the second region 122, thereby improving the image capture and display performance of the electronic device 100.

Figure 6:
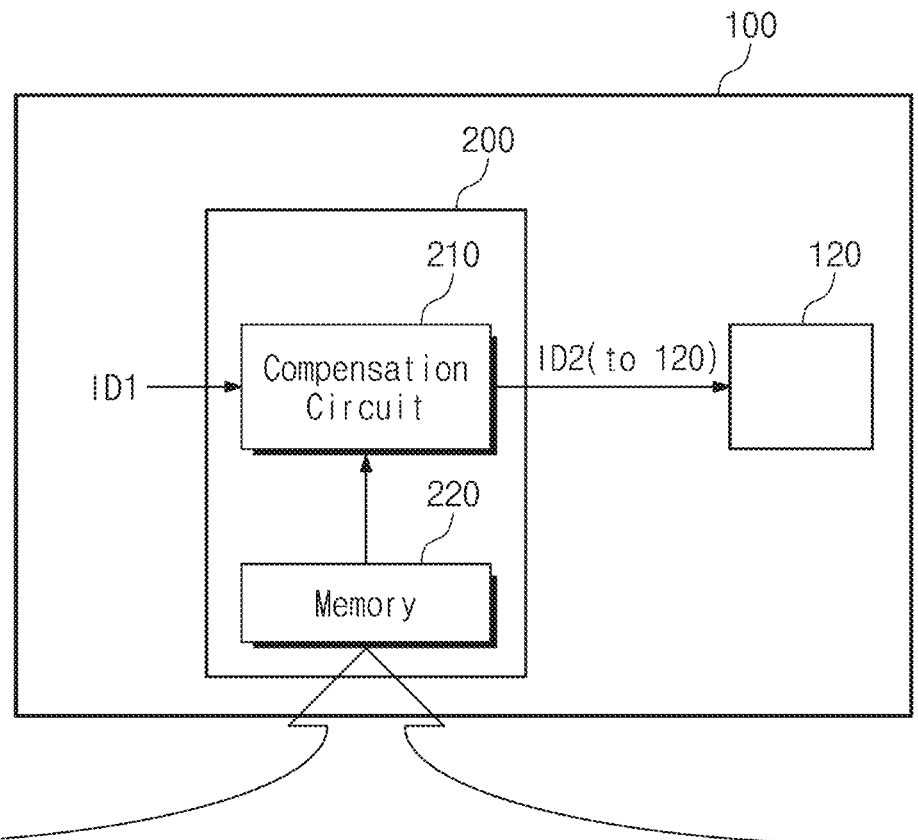
FIG. 6 illustrates a compensation device according to some example embodiments of the inventive concepts.

FIG. 6 illustrates a compensation device 200 according to some example embodiments of the inventive concepts. Referring to FIGS. 1 and 6, the compensation device 200 may be included in the electronic device 100. The compensation device 200 may include a compensation circuit 210 and a memory 220.

The electronic device 100, the compensation device 200, and/or any portions thereof (including, without limitation, compensation circuit 210 and/or memory 220) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (e.g., memory 220), storing a program of instructions, and a processor configured to execute the program of instructions to implement the functionality and/or methods performed by some or all of the electronic device 100 and/or compensation device 200, including the functionality and/or methods performed by some or all of the compensation circuit 210 and/or memory 220.

The memory 220 may include at least one of a volatile memory or a non-volatile memory. For instance, the non-volatile memory may include read-only memory (ROM), flash memory, phase-change RAM (PRAM), magnetic RAM (MRAM), resistive RAM (RRAM), and/or ferroelectric RAM (FRAM), and the volatile memory may include static RAM (SRAM) and/or dynamic RAM (DRAM), but the inventive concepts are not limited thereto. In some example embodiments, the memory 220 may include a hard disk drive (HDD) and/or a solid-state drive (SSD).

The compensation circuit 210 may receive first image data ID1 to be displayed through the display panel 120. The compensation circuit 210 may determine that the first image data ID1 corresponds to a set of at least one of 1) one or more particular first pixel groups PG1, of the first pixel groups PG1, that are adjacent to the boundary 123 between the first region 121 and the second region 122, or 2) one or more particular second pixel groups PG2, of the second pixel groups PG2, that are adjacent to the boundary 123 between the first region 121 and the second region 122, such that the first image data ID1 is determined to correspond to said boundary 123. In response to determining that the first image data ID1 corresponds to the boundary 123 between the first region 121 and the second region 122, the compensation circuit 210 may perform compensation for the first image data ID1, also referred to as compensating the first image data ID1 and/or processing the first image data ID1, to generate second image data ID2. In some example embodiments, the compensation circuit 210 may perform compensation for a portion of the first image data ID1 (e.g., partial pixel groups), which corresponds to the boundary 123 between the first region 121 and the second region 122. For example, the compensation circuit 210 may generate the second image data ID2 based on compensating the first image data ID1 such that a brightness of light emitted by first partial pixel groups of one or more particular first pixel groups PG1 adjacent to the boundary 123 (e.g., first pixel groups PG1 in blocks B3 and/or B4) increases and a brightness of light emitted by second partial pixel groups of the one or more particular first pixel groups PG1 adjacent to the boundary 123 (e.g., first pixel groups PG1 in blocks B5 and/or B6) decreases. In another example, the compensation circuit may generate the second image data ID2 based on compensating the first image data ID1 such that a brightness of light emitted by first partial pixel groups of one or more particular second pixel groups PG2 adjacent to the boundary 123 (e.g., second pixel groups PG2 in blocks B5 and/or B6) increases and a brightness of light emitted by second partial pixel groups of the one or more particular second pixel groups PG2 adjacent to the boundary 123 (e.g., second pixel groups PG2 in block B2) decreases.

First image data ID1 that corresponds to one or more particular pixel groups that are adjacent to the boundary 123 may refer to first image data ID1 indicating light that is to be emitted by one or more pixels of one or more pixel groups (e.g., first pixel group PG1 and/or second pixel group PG2) that are adjacent to the boundary 123 as described herein.

For example, the compensation circuit 210 may perform compensation based on a compensation scheme stored in the memory 220. The memory 220 may store compensation values for each of compensation units by which the compensation for the boundary 123 between the first region 121 and the second region 122 is made. A compensation value may include a gain GN or an offset value (or a difference value) OFF associated with a gray level of the first image data ID1. The compensation circuit 210 may apply compensation values to the first image data ID1 for each compensation unit and may generate second image data ID2. The second image data ID2 may be transferred to the display panel 120 so as to be displayed through the display panel 120.

In some example embodiments, the memory 220 may store two or more compensation schemes. The two or more compensation schemes may include different compensation units, different compensation targets, or different compensation values. One of the compensation schemes may be selected by a control signal from the outside (e.g., received from external to the compensation device 200 and/or external to the electronic device 100. The compensation circuit 210 may read the selected compensation scheme from the memory 220 and may perform compensation based on a compensation unit, a compensation target(s), and a compensation value(s) of the selected compensation scheme.

In some example embodiments, according to a first compensation scheme, a second compensation scheme, and a third compensation scheme, a compensation unit may be a group. A group may include two or more pixel groups. The memory 220 may store information about a compensation unit according to a location on the boundary between the first region 121 and the second region 122, as information about the compensation unit. For example, the memory 220 may store information about locations of groups targeted for compensation on the boundary.

According to the first compensation scheme, a compensation target may be the first region 121. The memory 220 may store location information of at least one group being a compensation target of the first region 121, which is adjacent to the boundary 123 between the first region 121 and the second region 122. The at least one group may include two or more first pixel groups PG1. Also, the memory 220 may store at least one gain or offset value GN/OFF corresponding to the at least one group being the compensation target. The compensation circuit 210 may apply the same gain or offset value GN/OFF to two or more first pixel groups PG1 belonging to each group of the first region 121, which is adjacent to the boundary 123.

According to the second compensation scheme, a compensation target may be the second region 122. The memory 220 may store location information of at least one group being a compensation target of the second region 122, which is adjacent to the boundary 123 between the first region 121 and the second region 122. The at least one group may include two or more second pixel groups PG2. Also, the memory 220 may store at least one gain or offset value GN/OFF corresponding to the at least one group being the compensation target. The compensation circuit 210 may apply the same gain or offset value GN/OFF to two or more second pixel groups PG2 belonging to each group of the second region 122, which is adjacent to the boundary.

According to the third compensation scheme, a compensation target may be the first region 121 and the second region 122. The memory 220 may store location information of at least one group being a compensation target of the first region 121 or the second region 122, which is adjacent to the boundary between the first region 121 and the second region 122. The at least one group may include two or more first pixel groups PG1, two or more second pixel groups PG2, or at least one first pixel group PG1 and at least one second pixel group PG2. Also, the memory 220 may store at least one gain or offset value GN/OFF corresponding to the at least one group being the compensation target. The compensation circuit 210 may apply the same gain or offset value GN/OFF to the first pixel group(s) PG1 or the second pixel group(s) PG2 belonging to each group of the first region 121 or the second region 122, which is adjacent to the boundary.

For example, according to a fourth compensation scheme, a fifth compensation scheme, and a sixth compensation scheme, a compensation unit may be a pixel group. The memory 220 may store information about a compensation unit according to a location on the boundary between the first region 121 and the second region 122, as information about the compensation unit. For example, the memory 220 may store information about locations of pixel groups targeted for compensation on the boundary.

According to the fourth compensation scheme, a compensation target may be the first region 121. The memory 220 may store information about locations of the first pixel groups PG1 being a compensation target of the first region 121, which is adjacent to the boundary between the first region 121 and the second region 122. Also, the memory 220 may store gains GN or offset values OFF corresponding to the first pixel groups PG1 being the compensation target. The compensation circuit 210 may apply the same gain or offset value GN/OFF to pixels belonging to each of the first pixel groups PG1 adjacent to the boundary.

According to the fifth compensation scheme, a compensation target may be the second region 122. The memory 220 may store information about locations of the second pixel groups PG2 being a compensation target of the second region 122, which is adjacent to the boundary between the first region 121 and the second region 122. Also, the memory 220 may store gains GN or offset values OFF corresponding to the second pixel groups PG2 being the compensation target. The compensation circuit 210 may apply the same gain or offset value GN/OFF to pixels belonging to each of the second pixel groups PG2 adjacent to the boundary.

According to the sixth compensation scheme, a compensation target may be the first region 121 and the second region 122. The memory 220 may store information about locations of the first pixel groups PG1 being a compensation target of the first region 121 or the second pixel groups PG2 being a compensation target of the second region 122, which is adjacent to the boundary between the first region 121 and the second region 122. Also, the memory 220 may store gains GN or offset values OFF corresponding to the first pixel groups PG1 or the second pixel groups PG2 being the compensation target. The compensation circuit 210 may apply the same gain or offset value GN/OFF to pixels belonging to each of the first pixel groups PG1 or the second pixel groups PG2 adjacent to the boundary.

According to a seventh compensation scheme, an eighth compensation scheme, and a ninth compensation scheme, a compensation unit may be a pixel. The memory 220 may store information about a compensation unit according to a location on the boundary between the first region 121 and the second region 122, as information about the compensation unit. For example, the memory 220 may store information about locations of pixels targeted for compensation on the boundary 123.

According to the seventh compensation scheme, a compensation target may be the first region 121. The memory 220 may store information about locations of the first pixels being a compensation target of the first region 121, which is adjacent to the boundary between the first region 121 and the second region 122. Also, the memory 220 may store gains GN or offset values OFF corresponding to the first pixels being the compensation target.

According to the eighth compensation scheme, a compensation target may be the second region 122. The memory 220 may store information about locations of the second pixels being a compensation target of the second region 122, which is adjacent to the boundary between the first region 121 and the second region 122. Also, the memory 220 may store gains GN or offset values OFF corresponding to the second pixels being the compensation target.

According to the ninth compensation scheme, a compensation target may be the first region 121 and the second region 122. The memory 220 may store information about locations of the first pixels being a compensation target of the first region 121, which is adjacent to the boundary between the first region 121 and the second region 122, or information about locations of the second pixels being a compensation target of the second region 122, which is adjacent to the boundary between the first region 121 and the second region 122. Also, the memory 220 may store gains GN or offset values OFF corresponding to the first pixels being the compensation target or the second pixels being the compensation target.

In some example embodiments, each of the seventh compensation scheme, the eighth compensation scheme, and the ninth compensation scheme may include gains GN or offset values OFF according to colors of pixels. For example, each of the seventh compensation scheme, the eighth compensation scheme, and the ninth compensation scheme may include gains GN or offset values OFF according to colors of pixels (e.g., the first pixels or the second pixels) adjacent to the boundary between the first region 121 and the second region 122. Accordingly, gains GN or offset values OFF of pixels (e.g., the first pixels or the second pixels) of different colors, which are adjacent to the boundary between the first region 121 and the second region 122, may be different.

According to a tenth compensation scheme, an eleventh compensation scheme, and a twelfth compensation scheme, a compensation unit may be a hybrid. A compensation unit may be selected from a group, a pixel group, and a pixel depending on a location on the boundary between the first region 121 and the second region 122. For example, when the first pixel groups PG1 and the second pixel groups PG2 adjacent to the boundary are uniformly arranged (or placed), a group may be selected as the compensation unit. In some example embodiments, in the case of a central portion of the first boundary, a central portion of the second boundary, a central portion of the third boundary, or a central portion of the fourth boundary, a group may be selected as the compensation unit.

For example, when the first pixel groups PG1 and the second pixel groups PG2 adjacent to the boundary are not uniformly arranged (or placed), a pixel group or a pixel may be selected as the compensation unit. In some example embodiments, in the case of outer portions (or remaining portions other than the central portion) of the first boundary, outer portions of the second boundary, outer portions of the third boundary, or outer portions of the fourth boundary, a pixel group or a pixel may be selected as the compensation unit.

The memory 220 may store information about a compensation unit according to a location on the boundary between the first region 121 and the second region 122, as information about the compensation unit. For example, the memory 220 may store location information of at least one group being a compensation target on the boundary, location information of at least one pixel group being a compensation target on the boundary, or location information of at least one pixel being a compensation target on the boundary.

According to the tenth compensation scheme, a compensation target may be the first region 121. The memory 220 may store information about a location of at least one group, at least one first pixel group PG1, or at least one first pixel being a compensation target of the first region 121, which is adjacent to the boundary between the first region 121 and the second region 122. Also, the memory 220 may store at least one gain or offset value GN/OFF corresponding to at least one group being the compensation target, at least one first pixel group PG1 being the compensation target, or at least one first pixel being the compensation target.

According to the eleventh compensation scheme, a compensation target may be the second region 122. The memory 220 may store information about a location of at least one group, at least one second pixel group PG2, or at least one second pixel being a compensation target of the first region 121, which is adjacent to the boundary between the first region 121 and the second region 122. Also, the memory 220 may store at least one gain or offset value GN/OFF corresponding to at least one group being the compensation target, at least one second pixel group PG2 being the compensation target, or at least one second pixel being the compensation target.

According to the twelfth compensation scheme, a compensation target may be the first region 121 and the second region 122. The memory 220 may store information about a location of at least one group, at least one first pixel group PG1, or at least one first pixel being a compensation target of the first region 121, which is adjacent to the boundary between the first region 121 and the second region 122, or may store information about a location of at least one group, at least one second pixel group PG2, or at least one second pixel being a compensation target of the second region 122, which is adjacent to the boundary between the first region 121 and the second region 122.

The memory 220 may store at least one gain or offset value GN/OFF corresponding to at least one group, at least one first pixel group PG1, or at least one first pixel being a compensation target of the first region 121, which is adjacent to the boundary between the first region 121 and the second region 122, or may store at least one gain or offset value GN/OFF corresponding to at least one group, at least one second pixel group PG2, or at least one second pixel being a compensation target of the second region 122, which is adjacent to the boundary between the first region 121 and the second region 122.

In some example embodiments, the compensation schemes stored in the memory 220 may further include gains GN or offset values OFF according to gray scale values. For example, each of the first to twelfth compensation schemes may include gains GN or offset values OFF according to a gray scale of a compensation unit adjacent to the boundary between the first region 121 and the second region 122. Each of the first to twelfth compensation schemes may include gains GN and offset values OFF according to specific gray scale values. The compensation circuit 210 may perform interpolation on gains GN, offset values OFF, and gray scale values associated with a gray scale of an image to be displayed in a compensation unit and may use a gain and an offset value obtained through the interpolation for the purpose of performing compensation.

Figure 7:
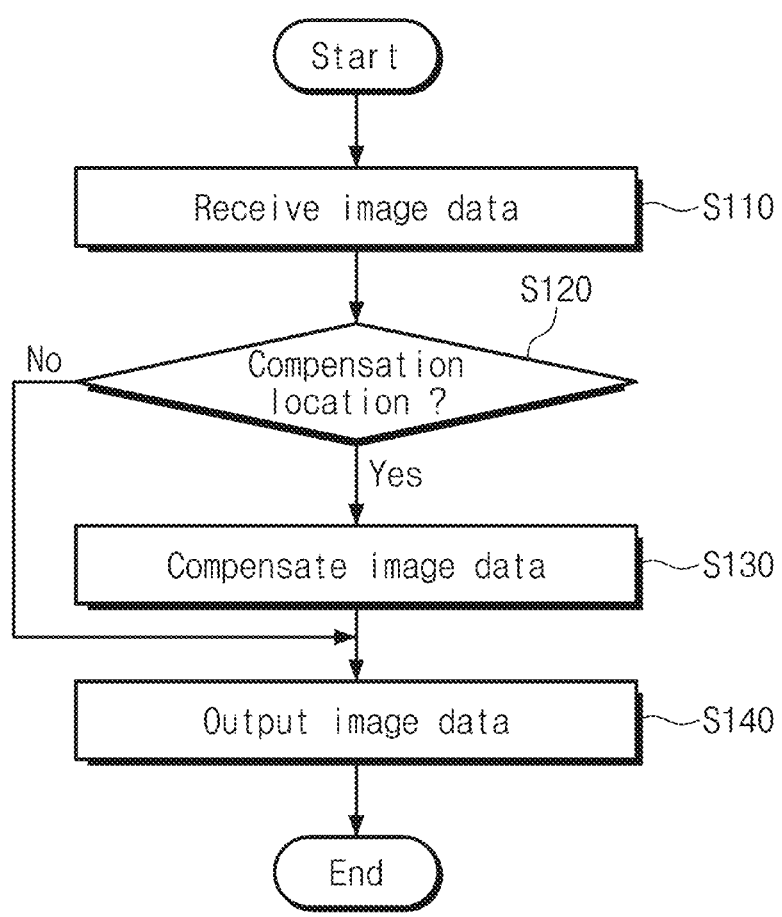
FIG. 7 illustrates an operating method of a compensation device according to some example embodiments of the inventive concepts.

FIG. 7 illustrates an operating method of the compensation device 200 according to some example embodiments of the inventive concepts. In some example embodiments, an operating method of the compensation device 200 may be understood to be an operating method of an electronic device 100 that includes the compensation device 200. Referring to FIGS. 6 and 7, in operation S110, the compensation circuit 210 may receive the first image data ID1. In operation S120, the compensation circuit 210 may determine whether the first image data ID1 correspond to a compensation location. For example, when the first image data ID1 are image data to be displayed through pixels including pixels present at the boundary between the first region 121 and the second region 122, the first image data ID1 may be determined as corresponding to the compensation location.

For example, the compensation circuit 210 may receive location information of the first image data ID1 from the outside and may determine whether the first image data ID1 correspond to the compensation location based on the location information. For another example, the compensation circuit 210 may receive a control signal indicating that the first image data ID1 correspond to the compensation location from the outside.

When the first image data ID1 do not correspond to the compensation location, in operation S140, the compensation circuit 210 may output the first image data ID1 as the second image data ID2.

When the first image data ID1 correspond to the compensation location, in operation S130, the compensation circuit 210 may make compensation for the first image data ID1 (e.g., compensate the first image data ID1) to generate the second image data ID2 and output the second image data ID2. In some example embodiments, the compensation circuit 210 may differently select compensation methods (e.g., to compensate the first image data) depending on (e.g., based on) placement patterns of the one or more particular first pixel groups PG1 adjacent to the boundary 123 and the one or more particular second pixel groups PG2 adjacent to the boundary 123.

As described with reference to the fifth block B5 and the sixth block B6 of FIG. 3, when the second pixel group PG2 is included in a specific region adjacent to and/or including the boundary 123 between the first region 121 and the second region 122, for example, a region corresponding to the size of the hole group HG, the compensation circuit 210 may generate the second image data ID2 from the first image data ID1 such that brightness of each of the first pixel groups PG1 or brightness of the second pixel group PG2 included in the specific region (also referred to as one or more partial pixel groups of one or more particular first pixel groups PG1 that are adjacent to the boundary 123) further decreases as the number (e.g., quantity) of first pixel groups PG1 included in the specific region increases. Restated, as a quantity of first pixel groups PG1 adjacent to the boundary 123 and included in a region (e.g., B5 and/or B6) that includes one second pixel group PG2 adjacent to the boundary 123, the compensation circuit 210 is configured to generate the second image data ID2 based on compensating the first image data ID1 such that a brightness of light emitted by the first pixel groups PG1 adjacent to the boundary and included in the region decreases, or a brightness of light emitted by the one second pixel group PG2 in the region decreases. It will be understood that, as described herein, a brightness of a pixel and/or pixel group refers to a brightness of light emitted by the pixel and/or pixel group.

As described with reference to the third block B3 and the fourth block B4 of FIG. 3, when the second pixel group PG2 is not included in a specific region adjacent to the boundary between the first region 121 and the second region 122, for example, a region corresponding to the size of the hole group HG, the compensation circuit 210 may generate the second image data ID2 from the first image data ID1 such that brightness of each of the first pixel groups PG1 included in the specific region (also referred to as one or more partial pixel groups of one or more particular first pixel groups PG1 that are adjacent to the boundary 123) further increases. Restated, when one or more (or all) of the particular second pixel groups PG2 adjacent to the boundary 123 in the display panel 120 are not included in a region (e.g., B3 and/or B4) that includes at least one first pixel group PG1 that is adjacent to the boundary 123, when the quantity of first pixel groups in said region decreases, the compensation circuit is configured to generate the second image data ID2 based on compensating the first image data such that a brightness of light emitted by the at least one first pixel group PG1 in the region increases.

As described with reference to the seventh block B7 and the eighth block B8 of FIG. 5, when pixels of the first region 121 and pixel holes of the second region 122 are adjacent to each other at the boundary 123 between the first region 121 and the second region 122 (or when a distance of the pixels of the second region 122 from the boundary is greater than a distance of the pixels of the first region 121 from the boundary), the compensation circuit 210 may decrease brightness of each of the first pixels 121a included in the seventh block B7 and the eighth block B8 (also referred to as one or more partial pixel groups of one or more particular first pixel groups PG1 that are adjacent to the boundary 123).

As described with reference to the ninth block B9 and the tenth block B10 of FIG. 5, when pixels of the first region 121 and pixels of the second region 122 are adjacent to each other at the boundary between the first region 121 and the second region 122, the compensation circuit 210 may decrease brightness of each of the first pixels 121a included in the ninth block B9 and the tenth block B10 (also referred to as one or more partial pixel groups of one or more particular first pixel groups PG1 that are adjacent to the boundary 123) and decrease brightness of each of the second pixels 122a included in the ninth block B9 and the tenth block B10 (also referred to as one or more partial pixel groups of one or more particular second pixel groups PG2 that are adjacent to the boundary 123).

In some example embodiments, for example with regard to the seventh through tenth blocks B7 to B10 collectively, the compensation circuit 210 may generate second image data ID2 based on compensating the first image data ID1 such that a brightness of light emitted by first partial pixels (e.g., some or all) of one or more particular first pixel groups PG1 adjacent to the boundary 123 (e.g., first pixels 121a included in the seventh and/or eighth blocks B7 and/or B8) increases and a brightness of light emitted by second partial pixels of the one or more particular first pixels groups PG1 adjacent to the boundary 123 (e.g., first pixels 121a included in the ninth and/or tenth blocks B9 and/or B10) decreases.

In some example embodiments, for example with regard to the seventh through tenth blocks B7 to B10 collectively, the compensation circuit 210 may generate second image data ID2 based on compensating the first image data ID1 such that a brightness of light emitted by first partial pixels (e.g., some or all) of one or more particular second pixel groups PG2 adjacent to the boundary 123 (e.g., second pixels 122a included in the tenth block B10) increases and a brightness of light emitted by second partial pixels of the one or more particular second pixel groups PG2 adjacent to the boundary 123 (e.g., second pixels 122a included in the ninth block B9) decreases.

In some example embodiments, where one or more first pixel groups PG1 (including one or more first pixel groups PG1 adjacent to the boundary 123) include two or more first pixels 121a, and one first pixel 121a of the two or more first pixels 121a is closest (e.g., most adjacent, or proximate) to the boundary 123 from among the two or more first pixels 121a of a first pixel group PG1 adjacent to the boundary 123, the compensation circuit 210 may generate second image data ID2 based on compensating the first image data ID1 such that a brightness of light emitted by the one first pixel 121a that is closes to the boundary 123 decreases (e.g., in relation to the brightness of light emitted by the other first pixels 121a of the two or more first pixels 121a included in said first pixel group PG1 that is adjacent to the boundary 123.

As described above, the compensation circuit 210 may obtain a compensation unit, a compensation target, and compensation values from the information stored in the memory 220 and may generate the second image data ID2 from the first image data ID1 by adjusting brightness of pixels based on the compensation unit, the compensation target, and the compensation values.

The memory 220 may store information for making compensation for the brightness difference described with reference to FIG. 3 and the unintended line(s) described with reference to FIG. 5. The compensation circuit 210 may make an image to be displayed through the display panel 120 better by performing compensation based on the information stored in the memory 220.

In operation S140, the compensation circuit 210 may output (e.g., transmit) the second image data ID2 (e.g., to the display panel 120). Afterwards, the compensation circuit 210 may terminate the compensation for the first image data ID1 received. When the first image data ID1 are further received, the compensation circuit 210 may further perform the operations of FIG. 7.

Figure 10:
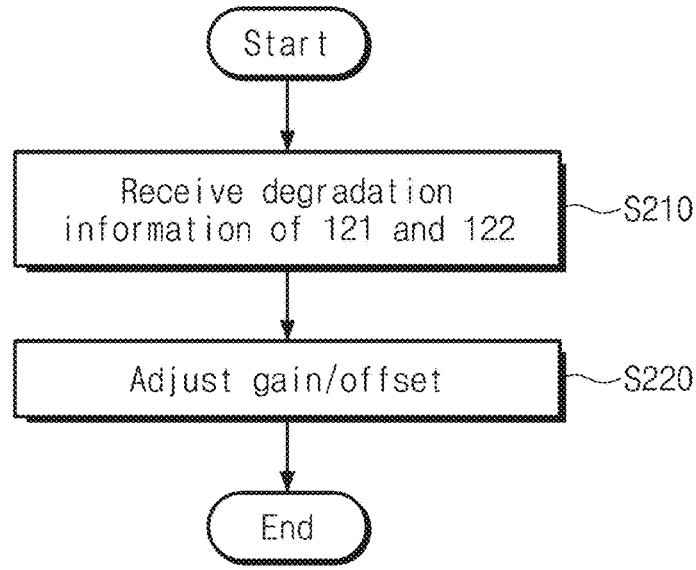
FIG. 10 illustrates an example in which a compensation device performs compensation by using sensing data according to some example embodiments of the inventive concepts.
Figure 11:
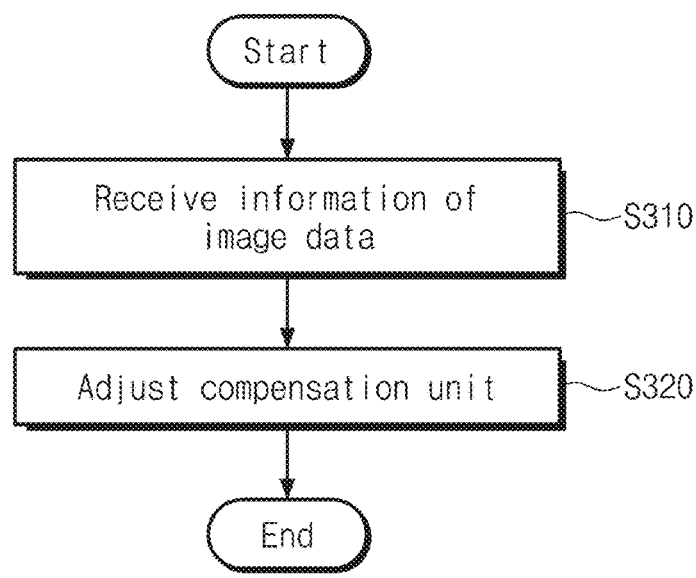
FIG. 11 illustrates an example in which a compensation device performs compensation based on information of image data according to some example embodiments of the inventive concepts.

In some example embodiments, the operating method of an electronic device (e.g., electronic device 100) that includes a display panel (e.g., 120) according to FIG. 7 may include receiving first and second image data at S110, where the first image data corresponds to a first region 121 of first pixels 121a of the display panel and the second image data corresponds to a second region 122 of second pixels 122a of the display panel, displaying the first image data through one or more first pixel groups PG1 of the first region 121 at S120=NO and S140, performing compensation of the second image data to generate third image data at S120=YES and S130 (e.g., via any of the methods for generating second image data ID2 based on compensating first image data ID1 as described herein according to any of the example embodiments), and displaying said third image data through one or more second pixel groups PG2 of the second region 122 at S140. In some example embodiments, the operating method may further include capturing fourth image data through the second region 122 via a camera 190, which may occur before, after, or concurrently with any of the operations S110-S140 shown in FIG. 7. Based on implementing an operation method according to any of the example embodiments described herein (e.g., as shown in FIG. 7 and further as shown in FIGS. 10 and 11), operational performance of an electronic device implementing the operation method may be improved (e.g., display performance may be improved based on said compensation while also enabling image capture through the second region of the display panel, thereby enabling improved image capture performance of the electronic device).

Figure 8:
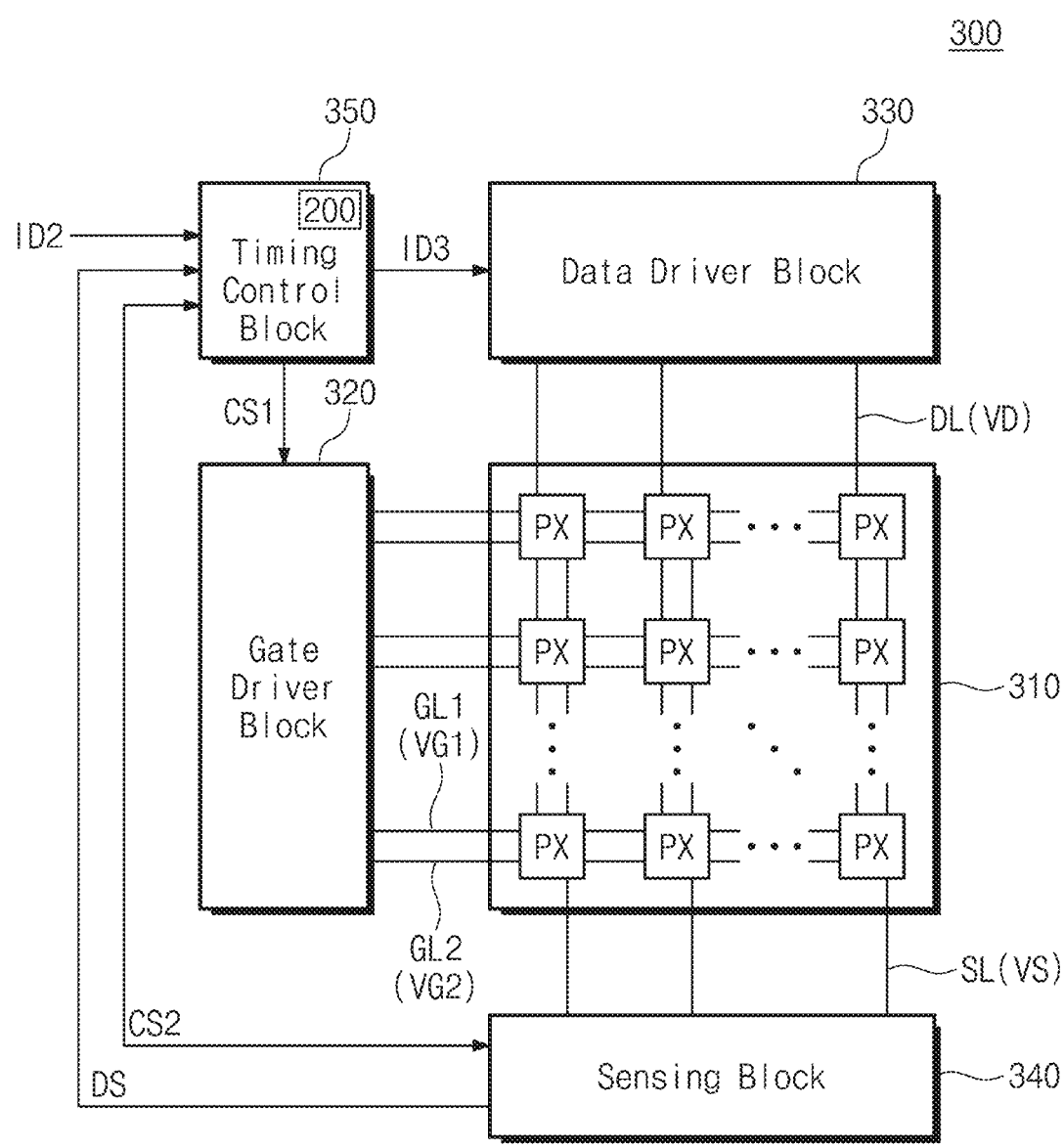
FIG. 8 is a block diagram illustrating a display device according to some example embodiments of the inventive concepts.

FIG. 8 is a block diagram illustrating a display device 300 according to some example embodiments of the inventive concepts. Referring to FIG. 8, the display device 300 according to some example embodiments of the inventive concepts may include a display panel 310, a gate driver block 320, a data driver block 330, a sensing block 340, and a timing control block 350.

The display device 300 may correspond to, implement, be implemented by, and/or be included in the electronic device 100. The display panel 310 may correspond to the display panel 120 of FIG. 1. The display panel 310 may include pixels PX. The pixels PX may be arranged in rows and columns. Rows of the pixels PX may be connected to the gate driver block 320 through a first gate line GL1 and a second gate line GL2. Columns of the pixels PX may be connected to the data driver block 330 through data lines DL and may be connected to the sensing block 340 through sensing lines SL.

For a display operation, the pixels PX in each row may be selected through the first gate line GL1. The pixels PX thus selected may adjust brightness based on currents or voltages that are supplied through the data lines DL. The pixels PX may adjust an image to be displayed to the outside through a brightness control.

For a sensing operation, the pixels PX in each row may be selected through the second gate line GL2. The pixels PX thus selected may output pieces of information about present brightness through the sensing lines SL.

The gate driver block 320 may be connected to the pixels PX through the first gate lines GL1 and the second gate lines GL2. For example, the gate driver block 320 may be connected to one row of pixels PX through one first gate line GL1 and one second gate line GL2.

The gate driver block 320 may adjust first gate voltages VG1 of the first gate lines GL1 and second gate voltages VG2 of the second gate lines GL2 in response to a first control signal CS1 output from the timing control block 350. For example, under control of the timing control block 350, the gate driver block 320 may adjust the first gate voltage VG1 of one first gate line GL1 to a first on voltage.

The first on voltage may be used to select pixels of a row targeted for the display operation. The gate driver block 320 may adjust the first gate voltages VG1 of the remaining first gate lines GL1 to a first off voltage in response to the first control signal CS1 output from the timing control block 350. The first off voltage may be used to set the pixels PX of the remaining rows to a non-selection state in the display operation.

In response to the first control signal CS1 from the timing control block 350, the gate driver block 320 may select the first gate lines GL1 sequentially once for the display operation during a time period corresponding to one frame of the second image data ID2.

The gate driver block 320 may adjust the second gate voltage VG2 of one second gate line GL2 to a second on voltage in response to the first control signal CS1 output from the timing control block 350. The second on voltage may be used to select pixels of a row targeted for the sensing operation. Under control of the timing control block 350, the gate driver block 320 may adjust the second gate voltages VG2 of the remaining second gate lines GL2 to a second off voltage. The second off voltage may be used to set the pixels PX of the remaining rows to a non-selection state in the sensing operation.

In response to the first control signal CS1 from the timing control block 350, the gate driver block 320 may select one or more second gate lines GL2 sequentially once for the sensing operation during a time period corresponding to one frame of the second image data ID2.

The data driver block 330 may be connected to the pixels PX through the data lines DL. For example, the data driver block 330 may be connected to one column of pixels PX through one data line DL. The data driver block 330 may receive third image data ID3 from the timing control block 350. The third image data ID3 may be data that are identical to the second image data ID2 or are obtained by compensating, at the timing control block 350, the second image data ID2.

The data driver block 330 may apply data voltages VD to the data lines DL, based on the third image data ID3. Each of the data voltages VD may have a level that is based on a portion of the third image data ID3 (e.g., a gray level to be displayed through a relevant pixel). The data driver block 330 may adjust brightness of the pixels PX of a selected row by using the data voltages VD.

The sensing block 340 may be connected to the pixels PX through the sensing lines SL. For example, the sensing block 340 may be connected to one column of pixels PX through the one sensing line SL. The sensing block 340 may receive sensing voltages VS from the pixels PX of a selected row through the sensing lines SL in response to a second control signal CS2 from the timing control block 350. The sensing block 340 may digitize the sensing voltages VS to generate sensing data DS. The sensing block 340 may provide the sensing data DS to the timing control block 350.

The timing control block 350 may receive the second image data ID2 from an external host device (e.g., the compensation device 200). The timing control block 350 may control the gate driver block 320 through the first control signal CS1 such that the gate driver block 320 sequentially selects the rows of the pixels PX (e.g., through the first gate line GL1 or the second gate line GL2).

The timing control block 350 may select a portion of the second image data ID2, which corresponds to the pixels PX of a selected row. The timing control block 350 may generate the third image data ID3 by compensating data corresponding to the pixels PX of the selected row based on the degree of degradation of the pixels PX of the selected row. The timing control block 350 may adjust brightness of the pixels PX of the selected row based on the compensated third image data ID3, by transmitting the third image data ID3 to the data driver block 330.

The timing control block 350 may further perform a sensing operation and a compensation operation. The sensing operation may refer to an operation of sensing the degree of degradation of the pixels PX in the display panel 310. For example, in the sensing operation, the timing control block 350 may control the sensing block 340 through the second control signal CS2 such that the sensing block 340 detects brightness of the pixels PX. The timing control block 350 may receive information about the brightness of the pixels PX as the sensing data DS.

The timing control block 350 may compare original brightness (i.e., brightness that the third image data ID3 indicate) to be displayed through the data driver block 330 and actual brightness (i.e., brightness that the sensing data DS indicate) detected by the sensing block 340 and may calculate brightness differences. The timing control block 350 may determine the brightness differences as the degrees of degradation of the pixels PX.

The timing control block 350 may perform the sensing operation on the pixels PX over two or more frames. For example, the timing control block 350 may divide the columns of the pixels PX into two or more groups. The timing control block 350 may perform the sensing operation on one of the two or more groups after transmitting the third image data ID3 corresponding to one frame to the pixels PX.

The compensation operation may refer to an operation of making compensation for levels (e.g., brightness values), through which the timing control block 350 compensates the second image data ID2 to the third image data ID3, based on the degrees of degradation of the pixels PX. For example, the compensation operation may be performed after the sensing operation is completely performed on all the pixels PX.

The timing control block 350 may include the compensation device 200. The compensation device 200 may perform the compensation operation of making compensation for the features described with reference to FIGS. 2 and 3 and the features described with reference to FIGS. 4 and 5. Also, the timing control block 350 may adjust the compensation operation, based on the sensing data DS.

In some example embodiments, the gate driver block 320, the data driver block 330, the sensing block 340, and the timing control block 350 may be manufactured in and/or implemented by one integrated circuit (e.g., a display driver integrated circuit (DDI)). For another example, the gate driver block 320, the data driver block 330, and the sensing block 340 may be manufactured in and/or implemented by one integrated circuit, and the timing control block 350 may be manufactured in and/or implemented by another integrated circuit.

The display device 300 and/or any portions thereof (including, without limitation, the gate driver block 320, the data driver block 330, the sensing block 340, and/or the timing control block 350) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive, storing a program of instructions, and a processor configured to execute the program of instructions to implement the functionality and/or methods performed by some or all of the display device 300, including the functionality and/or methods performed by some or all of the gate driver block 320, the data driver block 330, the sensing block 340, and the timing control block 350.

Figure 9:
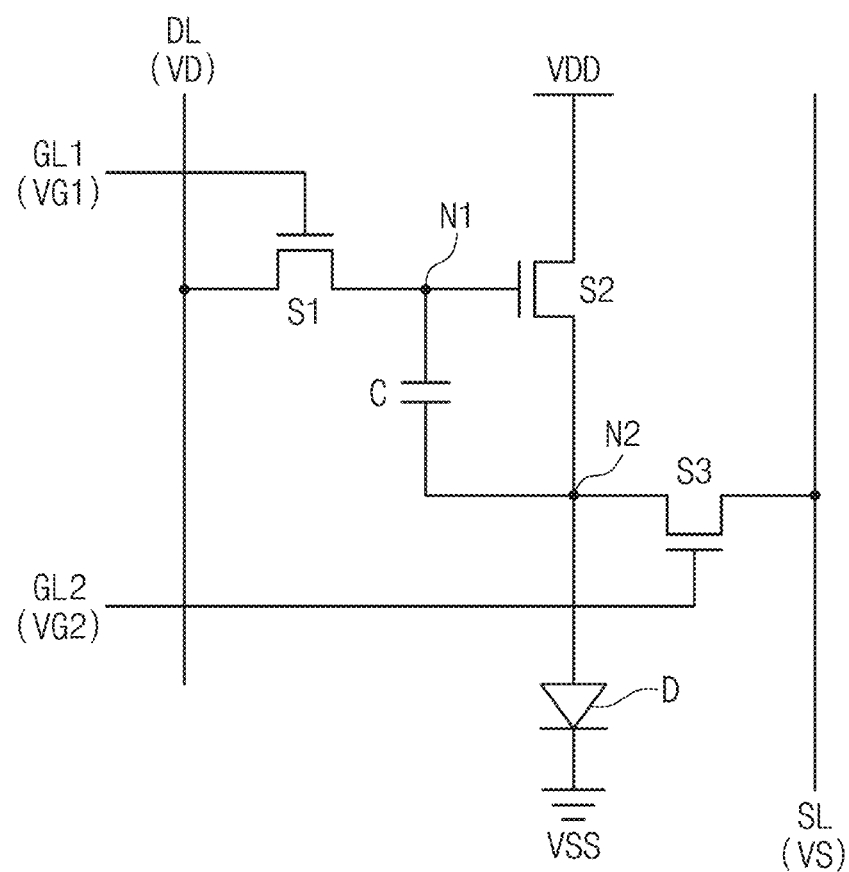
FIG. 9 is a circuit diagram illustrating a pixel according to some example embodiments of the inventive concepts.

FIG. 9 is a circuit diagram illustrating a pixel PX according to some example embodiments of the inventive concepts. Referring to FIGS. 8 and 9, the pixel PIX may include first to third switches S1 to S3, a capacitor "C", and a diode "D".

The first switch S1 may be connected between the data line DL and a first node N1. The first switch S1 may operate in response to the first gate voltage VG1 of the first gate line GL1. When the first gate voltage VG1 is the first on voltage, the first switch S1 may transfer the data voltage VD of the data line DL to the first node N1.

The second switch S2 may be connected between a power node, to which a power supply voltage VDD is supplied, and a second node N2. The second switch S2 may operate in response to a voltage of the first node N1. The capacitor "C" is connected between the first node N1 and the second node N2. When the first gate voltage VG1 is the first on voltage, the capacitor "C" may maintain a voltage difference of the first node N1 and the second node N2 at the data voltage VD. The second switch S2 may allow a current corresponding to the data voltage VD to flow from the power node to the second node N2.

The diode "D" may be connected between the second node N2 and a ground node to which a ground voltage VSS is supplied. The diode "D" may receive a current corresponding to the data voltage VD from the second node N2. The diode "D" may be an organic light-emitting diode (OLED) configured to emit a light, the brightness of which is proportional to a current flowing therethrough.

The third switch S3 is connected between the second node N2 and the sensing line SL. The third switch S3 may operate in response to the second gate voltage VG2 of the second gate line GL2. When the second gate voltage VG2 is the second on voltage, the third switch S3 may transfer a voltage, which is proportional to a current flowing through the second node N2, to the sensing line SL as the sensing voltage VS.

Some example embodiments is illustrated as the first to third switches S1 to S3 are NMOS transistors. However, the first to third switches S1 to S3 according to some example embodiments of the inventive concepts are not limited to NMOS transistors. Also, the structure of the pixel PX illustrated in FIG. 9 is exemplified for better understanding of the inventive concepts and is not limited to the example illustrated in FIG. 9.

FIGS. 10 and 11 illustrate operating methods of the compensation device 200 according to some example embodiments. FIG. 10 illustrates an example in which the compensation device 200 performs compensation by using the sensing data DS. Referring to FIGS. 6, 8, and 10, in operation S210, the compensation circuit 210 of the compensation device 200 may receive deterioration information of the first region 121 and the second region 122 from the timing control block 350. For example, the compensation circuit 210 may receive first region-related sensing information and second region-related sensing information of the sensing data DS as deterioration information of the first region 121 (e.g., first deterioration information of the first pixel groups PG1 of the first region 121) and deterioration information of the second region 122 (e.g., second deterioration of the second pixel groups PG2 of the second region 122), respectively.

In operation S220, the compensation circuit 210 may adjust gains GN or offsets OFF based on the deterioration information of the first region 121 and the deterioration information of the second region 122. Thus, the compensation circuit 210 may generate the second image data ID2 based on compensating the first image data ID1 based on said first deterioration information of the first pixel groups PG1 of the first region 121 and said second deterioration of the second pixel groups PG2 of the second region 122.

Because the first pixels of the first region 121 and the second pixels of the second region 122 are different in size and in brightness of the same gray level, the aspect of deterioration of the first pixels of the first region 121 may be different from the aspect of deterioration of the second pixels of the second region 122. Also, as deterioration progresses, there may be a need to adjust gains GN or offsets OFF for making compensation for pixels adjacent to the boundary between the first region 121 and the second region 122.

The memory 220 may store gains GN or offsets OFF according to the degrees of deterioration of the first region 121 and the degrees of deterioration of the second region 122 in the form of a table. In some example embodiments, the memory 220 may store a compensation function of the gains GN or the offsets OFF according to the degrees of deterioration of the first region 121 and the degrees of deterioration of the second region 122. The compensation circuit 210 may select gains GN or offsets OFF depending on the degree of degradation of the first region 121, the degree of degradation of the second region 122, and a location of the first image data ID1 on the boundary and may apply the selected gains GN or the selected offsets OFF to the first image data ID1 to generate the second image data ID2.

In some example embodiments, the compensation circuit 210 may further perform compensation according to the degree of degradation of the pixels PX. The memory 220 may further store gains GN or offsets OFF according to the degree of deterioration of pixels PX that are not adjacent to the boundary between the first region 121 and the second region 122.

When the first image data ID1 do not correspond to the boundary between the first region 121 and the second region 122, the compensation circuit 210 may make compensation for gray levels of the first image data ID1 based on the degree of degradation of the pixels PX and may generate the second image data ID2.

When the first image data ID1 correspond to the boundary between the first region 121 and the second region 122, the compensation circuit 210 may make compensation for the gray levels of the first image data ID1 based on the degree of degradation of the pixels PX and a location of the first image data ID1 on the boundary and may generate the second image data ID2.

In FIG. 8, the description is given as the compensation device 200 is included in the timing control block 350. However, the compensation device 200 may be included in the data driver block 330. The timing control block 350 may transfer the second image data ID2 as the third image data ID3 to the data driver block 330. The timing control block 350 may transfer the sensing data DS to the data driver block 330. The data driver block 330 may make compensation for gray levels of the third image data ID3 based on the sensing data DS and may control the data voltage VD of the data lines DL based on the compensated gray levels.

FIG. 11 illustrates an example in which the compensation device 200 performs compensation based on information of image data. Referring to FIGS. 6 and 11, in operation S310, the compensation circuit 210 may receive information of image data. For example, the information of the image data may include complexity of an image to be displayed through the first image data ID1. Thus, said information of image data received at S310 may include information indicating a complexity of the first image data ID1.

In operation S320, the compensation circuit 210 may adjust a compensation unit. For example, as the complexity of the image becomes higher, visibility of the features described with reference to FIGS. 2 and 3 and the features described with reference to FIGS. 4 and 5 may decrease.

Accordingly, as the complexity of the image becomes higher, the compensation circuit 210 may increase the compensation unit.

For example, assuming that a default compensation unit of the first image data ID1 is a pixel, as the complexity of the image becomes higher, the compensation circuit 210 may increase the compensation unit to a pixel group or a group. For another example, assuming that a default compensation unit of the first image data ID1 is a pixel group, as the complexity of the image becomes higher, the compensation circuit 210 may increase the compensation unit to a group. For another example, assuming that a default compensation unit of the first image data ID1 is a group, as the complexity of the image becomes higher, the compensation circuit 210 may increase the number of pixel groups or pixels to be included in the group. Thus, for example, at S320, the compensation circuit 210 may generate the second image data ID2 based on compensating the first image data ID1 based on the information indicating a complexity of the first image data ID1 that is received at S310.

In some example embodiments, a gray level of an image to be displayed through pixels (e.g., the first pixels or the second pixels) corresponding to the boundary between the first region 121 and the second region 122 may correspond to a maximum value. When the gray level of the image to be displayed corresponds to the maximum value, compensation causing an increase in the gray level of the image to be displayed through relevant pixels may not be permitted. For this reason, an unintended line may be displayed at the boundary between the first region 121 and the second region 122.

To prevent the above issue, the compensation circuit 210 may perform prescale. For example, the compensation circuit 210 may decrease gray levels of an image to be displayed linearly based on a specific gain or a specific offset or non-linearly based on a look-up table LUT. The look-up table LUT may include adjustment values (e.g., gains or offsets) according to gray levels (or a range of gray levels). Afterwards, the compensation circuit 210 may perform compensation on a prescale result. As gray levels decrease, it may be permitted for the compensation circuit 210 to perform compensation such that gray levels increase, thereby improving display performance (e.g., displayed image quality) of the display panel 120, and thus improving performance of the electronic device 100.

Figure 12:
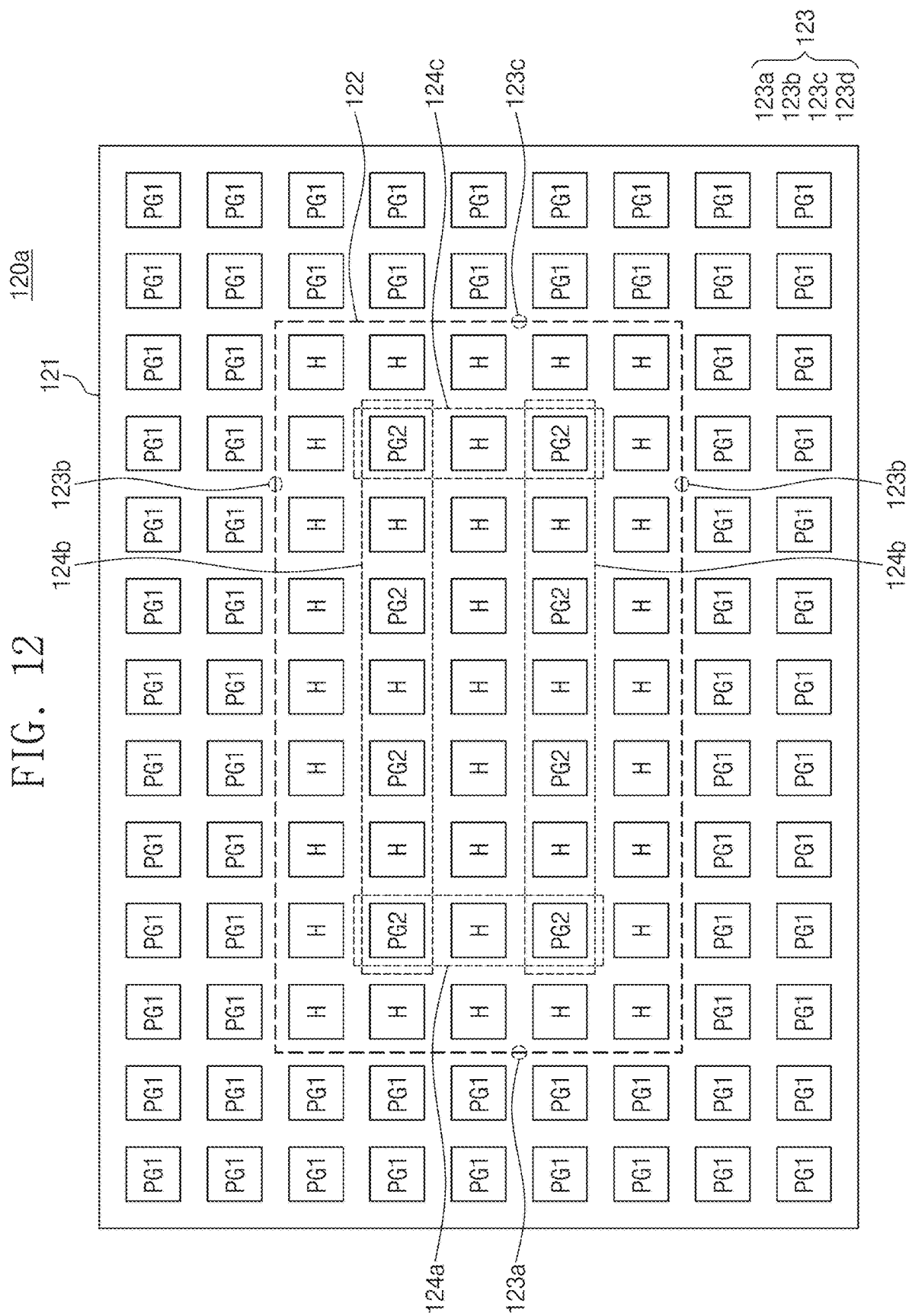
FIG. 12 illustrates a display panel according to some example embodiments.

FIG. 12 illustrates a display panel 120a according to some example embodiments. Referring to FIGS. 1 and 12, the second pixel groups PG2 of the same pattern may be provided in a portion of the second region 122, which is adjacent to the boundary 123 between the first region 121 and the second region 122. For example, in the second pixel groups PG2, a first pattern 124a of the second pixel groups PG2 adjacent to the first boundary 123a (i.e., the left side), a second pattern 124b of the second pixel groups PG2 adjacent to the second boundary 123b (i.e., the top side), a third pattern 124c of the second pixel groups PG2 adjacent to the third boundary 123c (i.e., the right side), and a fourth pattern 124d of the second pixel groups PG2 adjacent to the fourth boundary 123d (i.e., the bottom side) may be identical.

As shown in at least FIG. 12, the second pixel groups PG2 adjacent to the boundary may be spaced from the boundary 123 at least as much as a length corresponding to a width of each of the second pixel groups PG2. The holes "H" may be provided in the second region 122 so as to be adjacent to the boundary 123. The second pixel groups PG2 adjacent to the boundary 123 have the same pattern except for four edge portions of a quadrangular boundary 123. For example, there are always two of the first pixel groups PG1 adjacent to the boundary except for the four edge portions of the quadrangular boundary 123. There are always three of the first pixel groups PG1 adjacent to the four edge portions of the quadrangular boundary 123. Accordingly, a size of a compensation unit for making compensation for the features described with reference to FIGS. 2 and 3 and the features described with reference to FIGS. 4 and 5 may become larger. As the size of the compensation unit becomes larger, the complexity of compensation and a demand for a storage space for gains GN or offsets OFF may decrease.

Also, placement patterns of the first pixel groups PG1 and the holes "H" of the four edge portions of the quadrangular boundary 123 may be identical. Accordingly, the four edge portions may constitute one compensation unit for processing. Accordingly, the complexity of compensation and a demand for a storage space for gains GN or offsets OFF may decrease.

Figure 13:
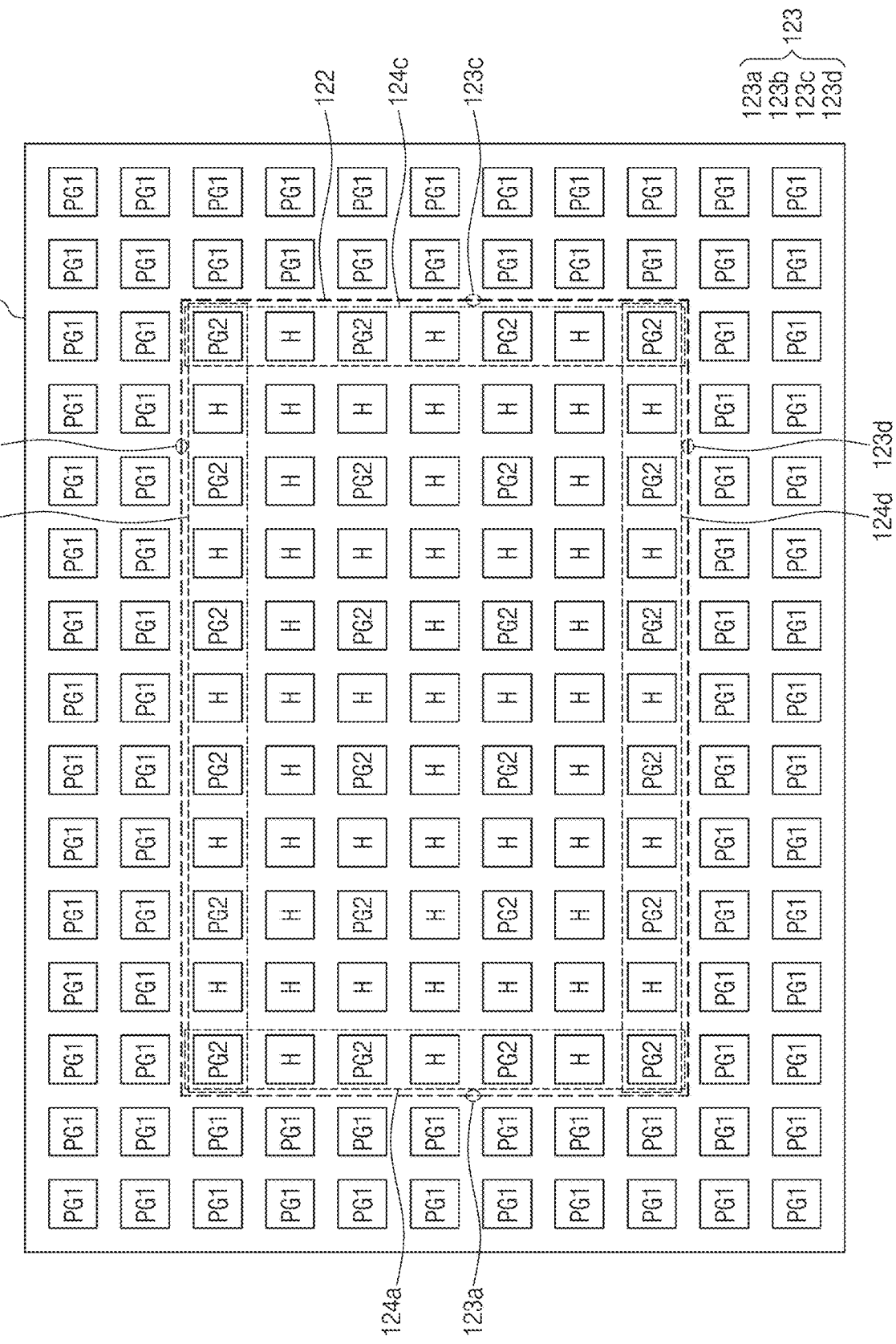
FIG. 13 illustrates a display panel according to some example embodiments.

FIG. 13 illustrates a display panel 120b according to some example embodiments. Referring to FIGS. 1 and 13, the second pixel groups PG2 of the same pattern may be provided in a portion of the second region 122, which is adjacent to the boundary 123 between the first region 121 and the second region 122. For example, in the second pixel groups PG2, a first pattern 124a of the second pixel groups PG2 adjacent to the first boundary 123a (i.e., the left side), a second pattern 124b of the second pixel groups PG2 adjacent to the second boundary 123b (i.e., the top side), a third pattern 124c of the second pixel groups PG2 adjacent to the third boundary 123c (i.e., the right side), and a fourth pattern 124d of the second pixel groups PG2 adjacent to the fourth boundary 123d (i.e., the bottom side) may be identical.

As shown in at least FIG. 13, the second pixel groups PG2 adjacent to the boundary 123 may be spaced from each other at least as much as a length corresponding to a width of each of the second pixel groups PG2 adjacent to the boundary 123. For example, the holes "H" and the second pixel groups PG2 may be alternately provided in the second region 122 so as to be adjacent to the boundary 123. The second pixel groups PG2 adjacent to the boundary 123 have the same pattern except for four edge portions of a quadrangular boundary 123. For example, there are always two of the first pixel groups PG1 and one of the second pixel groups PG2 adjacent to the boundary 123 except for the four edge portions of the quadrangular boundary 123. There are always three of the first pixel groups PG1 and one of the second pixel groups PG2 adjacent to the four edge portions of the quadrangular boundary 123. Accordingly, a size of a compensation unit for making compensation for the features described with reference to FIGS. 2 and 3 and the features described with reference to FIGS. 4 and 5 may become larger. As the size of the compensation unit becomes larger, the complexity of compensation and a demand for a storage space for gains GN or offsets OFF may decrease.

Also, placement patterns of the first pixel groups PG1 and the second pixel groups PG2 of the four corner portions of the quadrangular boundary are identical. Accordingly, the four edge portions may constitute one compensation unit for processing. Accordingly, the complexity of compensation and a demand for a storage space for gains GN or offsets OFF may decrease.

In some example embodiments, the description is given as the second region 122 is in the shape of a quadrangle. However, the shape of the second region 122 is not limited to the quadrangle. The second region 122 may be implemented in one of various polygons such as a hexagon and an octagon. The technical idea of the inventive concepts may be applied to the boundary 123 between the first region 121 and the second region 122, thus reducing or preventing an unintended line from being displayed at the boundary 123, thereby improving the quality of image data (e.g., images) displayed by the display panel 120 and thus improving the display performance of an electronic device 100 including said display panel 120 implementing an under display camera (e.g., camera 190) under the second region 122, wherein the second region 122 provides transparency to enable image data capture by the under display camera without deterioration of a display of an image across the first region 121, the second region 122, and/or the boundary 123 between the first and second regions 121 and 122 (thereby enabling improved display performance and image capture performance of the electronic device 100).

Figure 14:
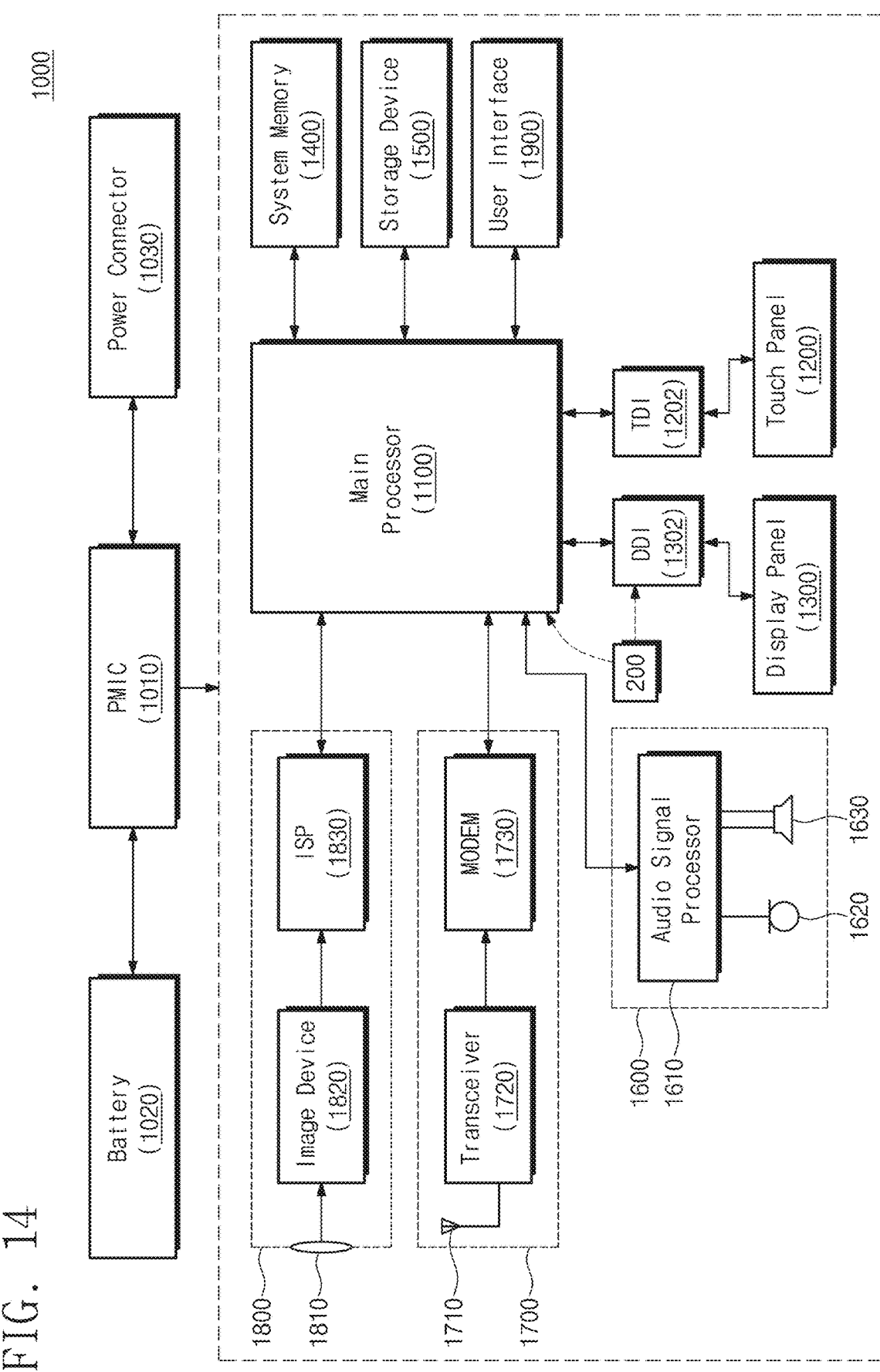
FIG. 14 is a block diagram illustrating an electronic device according to some example embodiments of the inventive concepts.

FIG. 14 is a block diagram illustrating an electronic device 1000 according to some example embodiments of the inventive concepts. The electronic device 1000 may correspond to the electronic device 100 of FIG. 1. Referring to FIG. 14, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In some example embodiments, the electronic device 1000 may be one of various electronic devices such as a personal computer, a laptop computer, a workstation, a portable communication terminal, a personal digital assistant (PDA), a portable media player (PMP), a digital camera, a smartphone, a tablet computer, and a wearable device.

The electronic device 1000 and/or any portions thereof (including, without limitation, main processor 1100) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (e.g., system memory 1400), storing a program of instructions, and a processor configured to execute the program of instructions to implement the functionality and/or methods performed by some or all of the electronic device 1000.

The main processor 1100 may control overall operations of the electronic device 1000. The main processor 1100 may control/manage operations of the components of the electronic device 1000. The main processor 1100 may process various operations for the purpose of operating the electronic device 1000. The touch panel 1200 may be configured to sense a touch input from a user under control of the touch driver integrated circuit 1202. The display panel 1300 may be configured to display image information under control of the display driver integrated circuit 1302.

The display panel 1300 may correspond to the display panel 120 of FIG. 1 and the display panel 310 of FIG. 8. The display driver integrated circuit 1302 may include the gate driver block 320, the data driver block 330, the sensing block 340, and the timing control block 350 of FIG. 8.

In FIG. 8, the description is given as the compensation device 200 is provided in the display driver integrated circuit 1302. However, the compensation device 200 may be provided in the main processor 1100. In this case, the display driver integrated circuit 1302, for example, the timing control block 350 may provide the main processor 1100 with the sensing data DS or information obtained by processing the sensing data DS, as degradation information. The compensation device 200 of the main processor 1100 may perform compensation for image data to be displayed through the display panel 1300 and may output image data being a compensation result to the display driver integrated circuit 1302. As a result of said compensation, the quality of image data (e.g., images) displayed through the display panel 1300 may be improved (e.g., to remove unintended lines from being displayed at the boundary 123 between first and second regions 121 and 122) in the display panel 1300, thereby improving the quality of image data (e.g., images) displayed by the display panel 1300, for example when the display panel 1300 implements an under display camera (UDC), such that both display performance and image capture performance of the electronic device 1000 may be improved (e.g., based on enabling image capture by an under display camera under a second region of the display panel 1300 while reducing or preventing reduction in displayed image quality of images displayed by the display panel 1300 at least at a boundary between the first and second regions of the display panel 1300).

The system memory 1400 may store data that are used for an operation of the electronic device 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and/or a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), or radio frequency identification (RFID).

The image processor 1800 (e.g., a camera, which may correspond to camera 190) may receive a light through a lens 1810. An image device 1820 (e.g., image sensor, such as a CMOS image sensor) and an image signal processor (ISP) 1830 included in the image processor 1800 may generate image information about an external object, based on a received light. The user interface 1900 may include an interface capable of exchange information with a user, except for the touch panel 1200, the display panel 1300, the audio processor 1600, and the image processor 1800. The user interface 1900 may include a keyboard, a mouse, a printer, a projector, various sensors, a human body communication device, etc.

The electronic device 1000 may further include a power management integrated circuit (IC) (PMIC) 1010, a battery 1020, and a power connector 1030. The power management IC 1010 may generate an interface power from a power supplied from the battery 1020 or a power supplied from the power connector 1030, and may provide the internal power to the main processor 1100, the touch panel 1200, the touch driver integrated circuit 1202, the display panel 1300, the display driver integrated circuit 1302, the system memory 1400, the storage device 1500, the audio processor 1600, the communication block 1700, the image processor 1800, and the user interface 1900.

In the above example embodiments, components according to the inventive concepts are described by using the terms "first", "second", "third", and the like. However, the terms "first", "second", "third", and the like may be used to distinguish components from each other and do not limit the inventive concepts. For example, the terms "first", "second", "third", and the like do not involve an order or a numerical meaning of any form.

In the above example embodiments, components according to some example embodiments of the inventive concepts are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

According to the inventive concepts, image data to be displayed at the boundary between a first region and a second region may be compensated for depending on a location of the image data on the boundary between the first region and the second region. An electronic device mitigating reduction in image quality at the boundary between the first region and the second region, or preventing an image quality from being reduced at the boundary between the first region and the second region, (and thus providing improved display performance of said electronic device, including improved quality of image data and/or images displayed by a display panel of said electronic device, and also enabling transparency of the second region to enable operation of an under display camera under the second region of the display panel) and an operating method of the electronic device are provided.

While the inventive concepts has been described with reference to example embodiments thereof, it will be apparent to those of ordinary skill in the art that various changes and modifications may be made thereto without departing from the spirit and scope of the inventive concepts as set forth in the following claims.

What is claimed is:

1. An electronic device, comprising:
a display panel including a plurality of pixel groups in a first region and a second region, the plurality of pixel groups including
first pixel groups in the first region, and
second pixel groups in the second region; and
a control circuit configured to
receive first image data,
generate second image data by adjusting gray values of the first image data corresponding to one or more pixel groups, wherein the one or more pixel groups are at least one of
one or more particular first pixel groups, which are a limited portion of the first pixel groups and that are adjacent to a boundary between the first region and the second region, or
one or more particular second pixel groups, which are limited portion of the second pixel groups and that are adjacent to the boundary, and
output the second image data to the display panel.

2. The electronic device of claim 1, wherein the second image data is compensated first image data.

3. The electronic device of claim 1, wherein the control circuit is configured to select an adjusting method among a plurality of adjusting methods.

4. The electronic device of claim 3, wherein the control circuit is configured to select the adjusting method based on a location of each of the one or more pixel groups.

5. The electronic device of claim 3, wherein the control circuit is configured to select the adjusting method based on a placement density of adjacent pixel groups of the one or more pixel groups.

6. The electronic device of claim 3, wherein the plurality of adjusting methods includes:
increasing gray values of a pixel group of the one or more pixel groups; and
decreasing the gray values of the pixel group of the one or more pixel groups.

7. The electronic device of claim 1, wherein, a pixel group in the second region is configured to emit light at a higher brightness than light emitted by a pixel group in the first region based on a same gray values.

8. The electronic device of claim 7, wherein the first region surrounds the second region.

9. The electronic device of claim 7, further comprising:
a camera configured to capture third image data through the second region.

10. The electronic device of claim 7, wherein a placement density of pixel groups of the first region is higher than a placement density of pixel groups of the second region.

11. The electronic device of claim 1, wherein the control circuit is configured to adjust the gray values of the one or more pixel groups based on gains and offsets.

12. An electronic device, comprising:
a display panel including a plurality of pixel groups in a first region and a second region, the plurality of pixel groups including
first pixel groups in the first region, and
second pixel groups in the second region; and
a control circuit configured to
receive first image data,
identify at least a portion of the first image data corresponding to one or more pixel groups, wherein the one or more pixel groups are at least one of
one or more particular first pixel groups, which are a limited portion of the first pixel groups and that are adjacent to a boundary between the first region and the second region, or
one or more particular second pixel groups, which are a limited portion of the second pixel groups and that are adjacent to the boundary,
generate second image data by adjusting gray values of the at least the portion of the first image data, and
output the second image data to the display panel.

13. The electronic device of claim 12, wherein the control circuit is further configured to output the first image data to the display panel if the first image data do not correspond to the one or more pixel groups.

14. The electronic device of claim 12, wherein the control circuit is configured to select an adjusting method among a plurality of adjusting methods.

15. The electronic device of claim 14, wherein the plurality of adjusting methods includes:
increasing gray values of a pixel group of the one or more pixel groups; and
decreasing the gray values of the pixel group of the one or more pixel groups.

16. The electronic device of claim 14, wherein the control circuit is configured to select the adjusting method based on a location of each of the one or more pixel groups.

17. The electronic device of claim 14, wherein the control circuit is configured to select the adjusting method based on a placement density of adjacent pixel groups of the one or more pixel groups.

18. The electronic device of claim 12, wherein the control circuit is configured to adjust the gray values such that
a brightness of light emitted by at least one of the one or more pixel groups in the first region increases, and
a brightness of light emitted by at least one the one or more pixel groups in the second region decreases.

19. The electronic device of claim 12, wherein the control circuit is configured to adjust the gray values such that
a brightness of light emitted by at least one of the one or more pixel groups in the second region increases, and
a brightness of light emitted by at least one of the one or more pixel groups in the first region decreases.

20. An electronic device, comprising:
a display panel including a plurality of pixel groups in a first region and a second region, the plurality of pixel groups including
first pixel groups in the first region, and
second pixel groups in the second region; and
a control circuit, wherein the control circuit is configured to
receive first gray values corresponding to a pixel group,
generate second gray values by adjusting the first gray values when the pixel group corresponds to one or more pixel groups, wherein the one or more pixel groups are at least one of
one or more particular first pixel groups, which are a limited portion of the first pixel groups and that are adjacent to a boundary between the first region and the second region, or
one or more particular second pixel groups, which are a limited portion of the second pixel groups and that are adjacent to the boundary, and
output the second gray values to the display panel.

* * * * *